United States Patent
Nellans et al.

(10) Patent No.: US 9,251,058 B2
(45) Date of Patent: Feb. 2, 2016

(54) SERVICING NON-BLOCK STORAGE REQUESTS

(71) Applicant: Fusion-io, Inc., Salt Lake City, UT (US)

(72) Inventors: David Nellans, Salt Lake City, UT (US); Anirudh Badam, Princeton, NJ (US); David Flynn, Sandy, UT (US); James Peterson, San Jose, CA (US)

(73) Assignee: SanDisk Technologies, Inc., Plano, TX (US)

( * ) Notice: Subject to any disclaimer, the term of this patent is extended or adjusted under 35 U.S.C. 154(b) by 265 days.

(21) Appl. No.: 13/730,466

(22) Filed: Dec. 28, 2012

(65) Prior Publication Data

US 2013/0117503 A1 May 9, 2013

Related U.S. Application Data

(63) Continuation-in-part of application No. 13/248,016, filed on Sep. 28, 2011.

(60) Provisional application No. 61/387,082, filed on Sep. 28, 2010.

(51) Int. Cl.
*G06F 12/00* (2006.01)
*G06F 3/06* (2006.01)
*G06F 12/02* (2006.01)

(52) U.S. Cl.
CPC .......... *G06F 12/0246* (2013.01); *G06F 3/0613* (2013.01); *G06F 3/0635* (2013.01); *G06F 3/0656* (2013.01); *G06F 3/0679* (2013.01)

(58) Field of Classification Search
CPC . G06F 12/0246; G06F 3/0613; G06F 3/0635; G06F 3/0656; G06F 3/0679
See application file for complete search history.

(56) References Cited

U.S. PATENT DOCUMENTS

| | | | |
|---|---|---|---|
| 5,586,297 A * | 12/1996 | Bryg et al. | 711/143 |
| 5,586,315 A | 12/1996 | Narang et al. | |
| 6,128,709 A | 10/2000 | Autechaud et al. | |
| 6,292,844 B1 | 9/2001 | Smyers et al. | |

(Continued)

FOREIGN PATENT DOCUMENTS

| | | |
|---|---|---|
| KR | 20000026300 | 5/2000 |
| KR | 20010034476 | 4/2001 |

(Continued)

OTHER PUBLICATIONS

PCT/US2011/053795, International Preliminary Report on Patentability, Apr. 11, 2013.

(Continued)

*Primary Examiner* — Yong Choe
*Assistant Examiner* — Rocio Del Mar Perez-Velez
(74) *Attorney, Agent, or Firm* — Kunzler Law Group, PC

(57) ABSTRACT

An apparatus, system, and method are disclosed for servicing storage requests for a non-volatile memory device. An interface module is configured to receive a storage request for a data set of a non-volatile memory device from a client. The data set is different from a block of the non-volatile memory device, and may have a length different from a block size of the non-volatile memory device. A block load module is configured to load data of at least the block size of the non-volatile memory device. A fulfillment module is configured to service the storage request using at least a portion of the loaded data.

22 Claims, 9 Drawing Sheets

(56) References Cited

U.S. PATENT DOCUMENTS

| | | | |
|---|---|---|---|
| 6,751,129 | B1 | 6/2004 | Gongwer |
| 7,720,821 | B1 | 5/2010 | Smyers et al. |
| 2007/0299883 | A1 | 12/2007 | Feeney et al. |
| 2008/0140724 | A1* | 6/2008 | Flynn et al. ................. 707/104.1 |
| 2010/0161888 | A1* | 6/2010 | Eggleston ..................... 711/103 |
| 2012/0239868 | A1 | 9/2012 | Ryan et al. |

FOREIGN PATENT DOCUMENTS

| | | |
|---|---|---|
| KR | 20050024278 | 3/2005 |
| KR | 20060107728 | 10/2006 |

OTHER PUBLICATIONS

Zhing, Mao, "EEL-6892-Virtual Computers", Lecture 18, University of Florida, Fall 2007, pp. 5.

"Hystor: Making SSDs the 'Survival of the Fittest' in High-Performance Storage Systems", pp. 14.

Petersen, Martin K., "DIF, DIX and Linux Data Integrity", Oracle, downloaded Jul. 2010, pp. 25, http://oss.oracle.com/projects/data-integrity/.

"Block Data Integrity", Kernel Trap, submitted Jun. 11, 2008, pp. 9, http://kerneltrap.org/Linus/Block_Data_Integrity.

Application No. PCT/US2011/053795, International Search Report and Written Opinion, May 4, 2012.

U.S. Appl. No. 13/248,016, Office Action, Aug. 29, 2014.

U.S. Appl. No. 13/248,016, Final Office Action, Mar. 2, 2015.

Weiss, Ronald, "A Technical Overview of the Sun Oracle Exadata Storage Server and Database Machine", Sep. 2009, pp. 25.

"Block Data Integrity", Kernel, Jun. 11, 2008, pp. 9, http://kerneltrap.org/Linux/Block_Data_Integrity.

U.S. Appl. No. 13/248,016, Notice of Allowance, Oct. 1, 2015.

Riedel, Erik, "Active Storage for Large-Scale Data Mining and Multimedia Applications", VLDB Conference, Aug. 1998, pgs.

Sungchan, Kim, "Fast, Energy Efficient Scan Inside Flash Memory SSDs", ADMS Workshop, Sep. 2, 2011, pp. 8.

\* cited by examiner

SERVICING NON-BLOCK STORAGE REQUESTS

CROSS-REFERENCES TO RELATED APPLICATIONS

This is a continuation-in-part application of and claims priority to U.S. patent application Ser. No. 13/248,016 entitled "APPARATUS, SYSTEM, AND METHOD FOR DATA TRANSFORMATIONS WITHIN A DATA STORAGE DEVICE" and filed on Sep. 28, 2011 for David Flynn, et al., which claims priority to U.S. Provisional Patent Application No. 61/387,082 entitled "APPARATUS, SYSTEM, AND METHOD FOR DATA TRANSFORMATIONS WITHIN A DATA STORAGE DEVICE" and filed on Sep. 28, 2010 for David Flynn, et al., each of which is incorporated herein by reference.

TECHNICAL FIELD

The present disclosure, in various embodiments, relates to data storage and more particularly relates to servicing storage requests for non-volatile recording devices.

BACKGROUND

Hard disk drives typically read and write data in blocks corresponding to sectors on a magnetic disk. Other data storage devices similarly use fixed size data blocks. Storage clients frequently use partial blocks of data, but such use causes access to and/or transfer of full blocks in order to use the partial blocks. Transferring full blocks is inefficient, as more data may be transferred than the client will use. This results in increased traffic on limited-bandwidth data buses, increased use of host memory, and increased processing overhead.

Using smaller block sizes may reduce the inefficiencies of transferring unused data. Storing data at a smaller granularity, however, can increase the metadata overhead associated with tracking and managing the data.

SUMMARY

A method is presented for servicing storage requests for a non-volatile recording device. In one embodiment, the method includes receiving a storage request for a data set of a non-volatile recording device. In certain embodiments, the data set is different in size from a block size of the non-volatile recording device. The method, in a further embodiment, includes reading one or more data blocks of the non-volatile recording device. In certain embodiments, the method includes transforming the data blocks to service the storage request.

An apparatus is presented for servicing storage requests for a non-volatile memory device. In one embodiment, an interface module is configured to receive a storage request from a client. In a further embodiment, the storage request is for a data set of a non-volatile memory device. In certain embodiments, the length of the data set is different from the block size of the non-volatile memory device. In one embodiment, a block load module is configured to load data of at least the block size of the non-volatile memory device. In a further embodiment, a fulfillment module is configured to service the storage request using at least a portion of the loaded data.

Another apparatus is presented for servicing storage requests for a non-volatile storage device. In one embodiment, the apparatus includes means for receiving a write request from a client. In a further embodiment, the write request is for a data set of a non-volatile storage device. In certain embodiments, the length of the data set is less than the block size for the non-volatile storage device. In some embodiments, the apparatus includes means for loading data of at least the block size for the non-volatile memory device. In certain embodiments, the apparatus includes means for servicing the write request using at least a portion of the loaded data.

A system is presented for servicing storage requests for a non-volatile recording device. In one embodiment, a non-volatile recording device is configured to store data in one or more native blocks. In a further embodiment, the non-volatile recording device is in communication with a host device over a communications bus. In certain embodiments, a presented block module is configured to provide access to the data of the non-volatile recording device as one or more presented blocks. In a further embodiment, the presented block size differs from the native block size. An interface module, in one embodiment, is configured to receive a storage request for a set of one or more presented blocks. In another embodiment, a block load module is configured to read a set of one or more native blocks of the non-volatile recording device without outputting the set of native blocks over the communications bus. In a further embodiment, the set of native blocks includes the set of presented blocks. In one embodiment, a fulfillment module is configured to transform the set of native blocks to service the storage request.

A computer program product is presented to perform operations for servicing storage requests for a non-volatile memory device. In certain embodiments, the computer program product includes a computer readable storage medium storing computer usable program code executable to perform the operations of the computer program product. In one embodiment, the operations include storing data of a non-volatile memory device in one or more native blocks. In a further embodiment, the non-volatile memory device is in communication with a host device over a communications bus. In certain embodiments, the operations include providing access to the data of the non-volatile memory device from the host device as one or more presented blocks. In a further embodiment, the presented block size differs from the native block size. The operations, in one embodiment, include receiving a storage request for a set of one or more presented blocks. In certain embodiments, the operations include reading a set of one or more native blocks of the non-volatile memory device. In a further embodiment, the set of native blocks includes the set of presented blocks. The operations, in one embodiment, include transforming the set of native blocks to service the storage request.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1A:
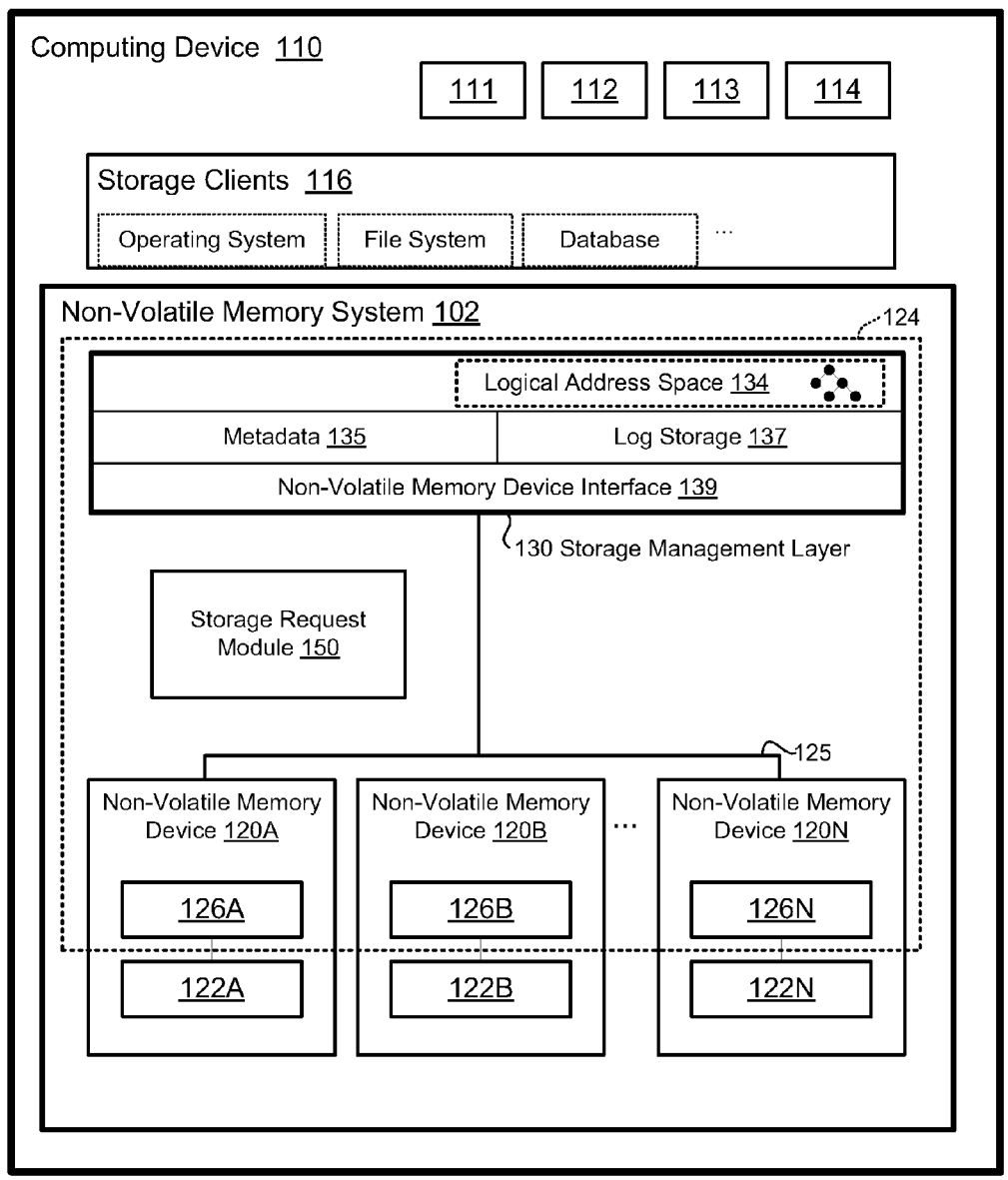
FIG. 1A is a schematic block diagram of one embodiment of a non-volatile memory system.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

According to various embodiments, a non-volatile memory controller manages one or more non-volatile memory devices. The non-volatile memory device(s) may comprise recording, memory, or storage devices, such as solid-state storage device(s), that are arranged and/or partitioned into a plurality of addressable media storage locations. As used herein, a media storage location refers to any physical unit of memory (e.g., any quantity of physical storage media on a non-volatile memory device). Memory units may include, but are not limited to: pages, memory divisions, erase blocks, sectors, blocks, collections or sets of physical storage locations (e.g., logical pages, logical erase blocks, described below), or the like.

The non-volatile memory controller may comprise a storage management layer ("SML"), which may present a logical address space to one or more storage clients. One example of an SML is the Virtual Storage Layer® of Fusion-io, Inc. of Salt Lake City, Utah. Alternatively, each non-volatile memory device may comprise a non-volatile memory media controller, which may present a logical address space to the storage clients. As used herein, a logical address space refers to a logical representation of memory resources. The logical address space may comprise a plurality (e.g., range) of logical addresses. As used herein, a logical address refers to any identifier for referencing a memory resource (e.g., data), including, but not limited to: a logical block address ("LBA"), cylinder/head/sector ("CHS") address, a file name, an object identifier, an inode, a Universally Unique Identifier ("UUID"), a Globally Unique Identifier ("GUID"), a hash code, a signature, an index entry, a range, an extent, or the like.

The SML may maintain metadata, such as a forward index, to map logical addresses of the logical address space to media storage locations on the non-volatile memory device(s). The SML may provide for arbitrary, any-to-any mappings from logical addresses to physical storage resources. As used herein, an "any-to any" mapping may map any logical address to any physical storage resource. Accordingly, there may be no pre-defined and/or pre-set mappings between logical addresses and particular, media storage locations and/or media addresses. As used herein, a media address refers to an address of a memory resource that uniquely identifies one memory resource from another to a controller that manages a plurality of memory resources. By way of example, a media address includes, but is not limited to: the address of a media storage location, a physical memory unit, a collection of physical memory units (e.g., a logical memory unit), a portion of a memory unit (e.g., a logical memory unit address and offset, range, and/or extent), or the like. Accordingly, the SML may map logical addresses to physical data resources of any size and/or granularity, which may or may not correspond to the underlying data partitioning scheme of the non-volatile memory device(s). For example, in some embodiments, the non-volatile memory controller is configured to store data within logical memory units that are formed by logically combining a plurality of physical memory units, which may allow the non-volatile memory controller to support many different virtual memory unit sizes and/or granularities.

As used herein, a logical memory element refers to a set of two or more non-volatile memory elements that are or are capable of being managed in parallel (e.g., via an I/O and/or control bus). A logical memory element may comprise a plurality of logical memory units, such as logical pages, logical memory divisions (e.g., logical erase blocks), and so on. As used herein, a logical memory unit refers to a logical construct combining two or more physical memory units, each physical memory unit on a respective non-volatile memory element in the respective logical memory element (each non-volatile memory element being accessible in parallel). As used herein, a logical memory division refers to a set of two or more physical memory divisions, each physical memory division on a respective non-volatile memory element in the respective logical memory element.

The logical address space presented by the storage management layer may have a logical capacity, which may correspond to the number of available logical addresses in the logical address space and the size (or granularity) of the data referenced by the logical addresses. For example, the logical capacity of a logical address space comprising 2^32 unique logical addresses, each referencing 2048 bytes (2 KiB) of data may be 2^43 bytes. (As used herein, a kibibyte (KiB) refers to 1024 bytes). In some embodiments, the logical address space may be thinly provisioned. As used herein, a "thinly provisioned" logical address space refers to a logical address space having a logical capacity that exceeds the physical capacity of the underlying non-volatile memory device(s). For example, the storage management layer may present a 64-bit logical address space to the storage clients (e.g., a logical address space referenced by 64-bit logical addresses), which exceeds the physical capacity of the underlying non-volatile memory devices. The large logical address space may allow storage clients to allocate and/or reference contiguous ranges of logical addresses, while reducing the chance of naming conflicts. The storage management layer may leverage the any-to-any mappings between logical addresses and physical storage resources to manage the logical address space independently of the underlying physical storage devices. For example, the storage management layer may add and/or remove physical storage resources seamlessly, as needed, and without changing the logical addresses used by the storage clients.

The non-volatile memory controller may be configured to store data in a contextual format. As used herein, a contextual format refers to a self-describing data format in which persistent contextual metadata is stored with the data on the physical storage media. The persistent contextual metadata provides context for the data it is stored with. In certain embodiments, the persistent contextual metadata uniquely identifies the data that the persistent contextual metadata is stored with. For example, the persistent contextual metadata may uniquely identify a sector of data owned by a storage client from other sectors of data owned by the storage client. In a further embodiment, the persistent contextual metadata identifies an operation that is performed on the data. In a further embodiment, the persistent contextual metadata identifies a sequence of operations performed on the data. In a further embodiment, the persistent contextual metadata identifies security controls, a data type, or other attributes of the data. In a certain embodiment, the persistent contextual metadata identifies at least one of a plurality of aspects, including data type, a unique data identifier, an operation, and a sequence of operations performed on the data. The persistent contextual metadata may include, but is not limited to: a logical address of the data, an identifier of the data (e.g., a file name, object id, label, unique identifier, or the like), reference(s) to other data (e.g., an indicator that the data is associated with other data), a relative position or offset of the data with respect to other data (e.g., file offset, etc.), data size and/or range, and the like. The contextual data format may comprise a packet format comprising a data segment and one or more headers. Alternatively, a contextual data format may associate data with context information in other ways (e.g., in a dedicated index on the non-volatile memory media, a memory division index, or the like).

In some embodiments, the contextual data format may allow data context to be determined (and/or reconstructed) based upon the contents of the non-volatile memory media, and independently of other metadata, such as the arbitrary, any-to-any mappings discussed above. Since the media location of data is independent of the logical address of the data, it may be inefficient (or impossible) to determine the context of data based solely upon the media location or media address of the data. Storing data in a contextual format on the non-volatile memory media may allow data context to be determined without reference to other metadata. For example, the contextual data format may allow the metadata to be reconstructed based only upon the contents of the non-volatile memory media (e.g., reconstruct the any-to-any mappings between logical addresses and media locations).

In some embodiments, the non-volatile memory controller may be configured to store data on one or more asymmetric, write-once media, such as solid-state storage media. As used herein, a "write once" storage medium refers to a storage medium that is reinitialized (e.g., erased) each time new data is written or programmed thereon. As used herein, an "asymmetric" storage medium refers to a storage medium having different latencies for different storage operations. Many types of solid-state storage media are asymmetric; for example, a read operation may be much faster than a write/program operation, and a write/program operation may be much faster than an erase operation (e.g., reading the media may be hundreds of times faster than erasing, and tens of times faster than programming the media). The memory media may be partitioned into memory divisions that can be erased as a group (e.g., erase blocks) in order to, inter alia, account for the asymmetric properties of the media. As such, modifying a single data segment in-place may require erasing the entire erase block comprising the data, and rewriting the modified data to the erase block, along with the original, unchanged data. This may result in inefficient "write amplification," which may excessively wear the media. Therefore, in some embodiments, the non-volatile memory controller may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (the erasure latency is no longer part of the critical path of a write operation).

The non-volatile memory controller may comprise one or more processes that operate outside of the regular path for servicing of storage operations (the "path" for performing a storage operation and/or servicing a storage request). As used herein, the "path for servicing a storage request" or "path for servicing a storage operation" (also referred to as the "critical path") refers to a series of processing operations needed to service the storage operation or request, such as a read, write, modify, or the like. The path for servicing a storage request may comprise receiving the request from a storage client, identifying the logical addresses of the request, performing one or more storage operations on non-volatile memory media, and returning a result, such as acknowledgement or data. Processes that occur outside of the path for servicing storage requests may include, but are not limited to: a groomer, de-duplication, and so on. These processes may be implemented autonomously and in the background, so that they do not interfere with or impact the performance of other storage operations and/or requests. Accordingly, these processes may operate independent of servicing storage requests.

In some embodiments, the non-volatile memory controller comprises a groomer, which is configured to reclaim memory divisions (e.g., erase blocks) for reuse. The write out-of-place paradigm implemented by the non-volatile memory controller may result in obsolete or invalid data remaining on the non-volatile memory media. For example, overwriting data X with data Y may result in storing Y on a new memory division (rather than overwriting X in place), and updating the any-to-any mappings of the metadata to identify Y as the valid, up-to-date version of the data. The obsolete version of the data X may be marked as invalid, but may not be immediately removed (e.g., erased), since, as discussed above, erasing X may involve erasing an entire memory division, which is a time-consuming operation and may result in write amplification. Similarly, data that is no longer is use (e.g., deleted or trimmed data) may not be immediately removed. The non-volatile memory media may accumulate a significant amount of invalid data. A groomer process may operate outside of the critical path for servicing storage operations. The groomer process may reclaim memory divisions so that they can be reused for other storage operations. As used herein, reclaiming a memory division refers to erasing the memory division so that new data may be stored/programmed thereon. Reclaiming a memory division may comprise relocating valid data on the memory division to a new location. The groomer may identify memory divisions for reclamation based upon one or more factors, which may include, but are not limited to: the amount of invalid data in the memory division, the amount of valid data in the memory division, wear on the memory division (e.g., number of erase cycles), time since the memory division was programmed or refreshed, and so on.

The non-volatile memory controller may be further configured to store data in a log format. As described above, a log format refers to a data format that defines an ordered sequence of storage operations performed on a non-volatile memory media. In some embodiments, the log format comprises storing data in a pre-determined sequence of media addresses of the non-volatile memory media (e.g., within sequential pages and/or erase blocks of the media). The log format may further comprise associating data (e.g., each packet or data segment) with respective sequence indicators. The sequence indicators may be applied to data individually (e.g., applied to each data packet) and/or to data groupings (e.g., packets stored sequentially on a memory division, such as an erase block). In some embodiments, sequence indicators may be applied to memory divisions when the memory divisions are reclaimed (e.g., erased), as described above, and/or when the memory divisions are first used to store data.

In some embodiments the log format may comprise storing data in an "append only" paradigm. The non-volatile memory controller may maintain a current append point at a media address of the non-volatile memory device. The append point may be a current memory division and/or offset within a memory division. Data may then be sequentially appended from the append point. The sequential ordering of the data, therefore, may be determined based upon the sequence indicator of the memory division of the data in combination with the sequence of the data within the memory division. Upon reaching the end of a memory division, the non-volatile memory controller may identify the "next" available memory division (the next memory division that is initialized and ready to store data). The groomer may reclaim memory divisions comprising invalid, stale, and/or deleted data, to ensure that data may continue to be appended to the media log.

The log format described herein may allow valid data to be distinguished from invalid data based upon the contents of the non-volatile memory media, and independently of other metadata. As discussed above, invalid data may not be removed from the non-volatile memory media until the memory division comprising the data is reclaimed. Therefore, multiple "versions" of data having the same context may exist on the non-volatile memory media (e.g., multiple versions of data having the same logical addresses). The sequence indicators associated with the data may be used to distinguish invalid versions of data from the current, up-to-date version of the data; the data that is the most recent in the log is the current version, and previous versions may be identified as invalid.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description.

FIG. 1A is a block diagram of one embodiment of a system 100 comprising a storage request module 150. The storage request module 150 may be part of and/or in communication with a storage management layer (SML) 130. The SML 130 may operate on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 (and/or non-volatile memory controller 124) to a communication network, such as a Internet Protocol network, a Storage Area Network, or the like.

The computing device 110 may further comprise a non-transitory, computer readable storage media 114. The computer readable storage media 114 may comprise executable instructions configured to cause the computing device 110 (e.g., processor 111) to perform steps of one or more of the methods disclosed herein. Alternatively, or in addition, the storage management layer 130 and/or one or more modules thereof may be embodied as one or more computer readable instructions stored on the non-transitory storage media 114.

The storage management layer 130 may be configured to provide storage services to one or more storage clients 116. The storage clients 116 may include local storage clients 116 operating on the computing device 110 and/or remote, storage clients 116 accessible via the network (and network interface 113). The storage clients 116 may include, but are not limited to: operating systems, file systems, database applications, server applications, kernel-level processes, user-level processes, applications, and the like.

Figure 1B:
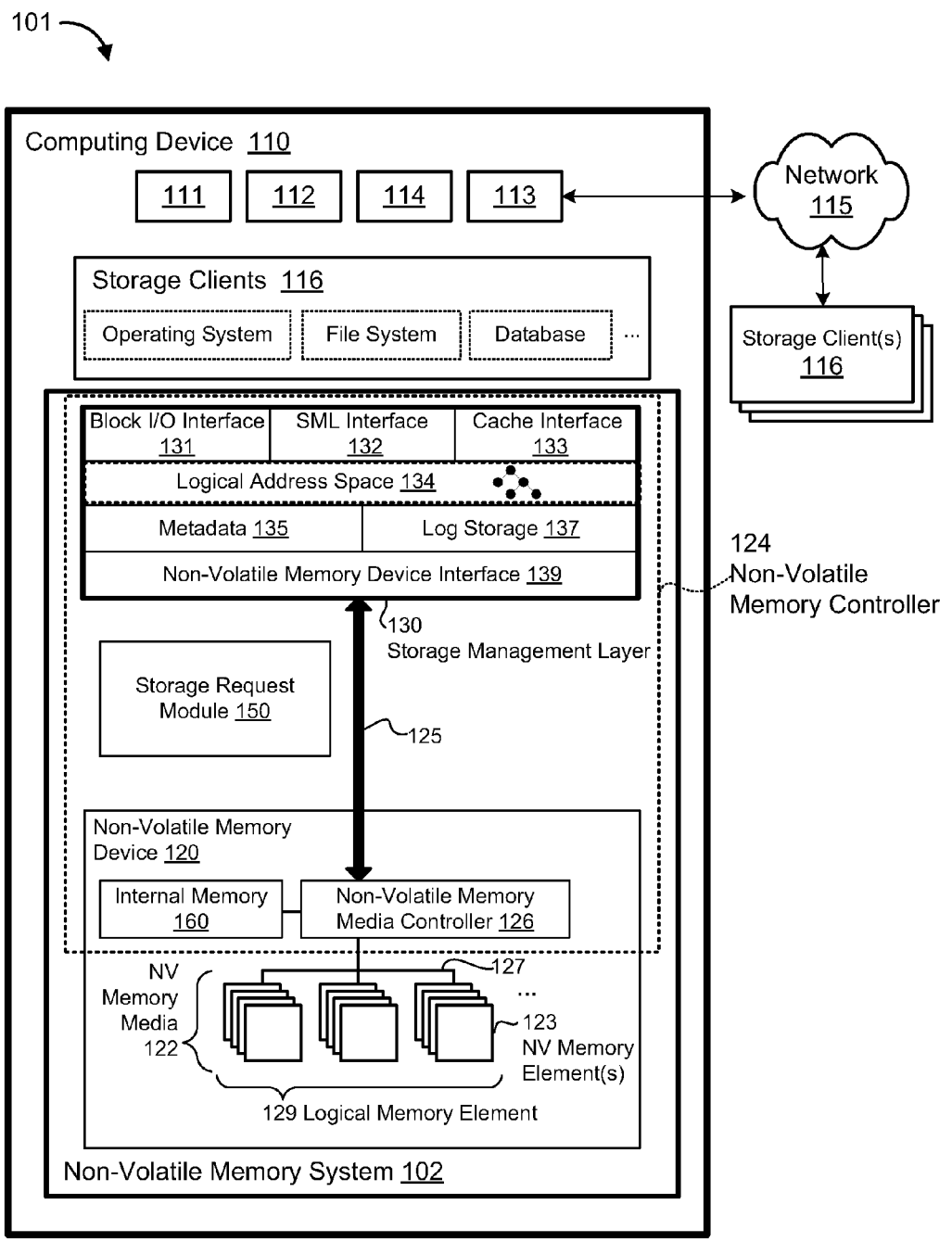
FIG. 1B is a schematic block diagram of another embodiment of a non-volatile memory system.

The storage management layer 130 comprises and/or is communicatively coupled to one or more non-volatile memory devices 120A-N. The non-volatile memory devices 120A-N may include different types of non-volatile memory devices including, but not limited to: solid-state storage devices, hard drives, SAN storage resources, or the like. The non-volatile memory devices 120A-N may comprise respective non-volatile memory media controllers 126A-N and non-volatile memory media 122A-N. As illustrated in FIG. 1B, The SML 130 may provide access to the non-volatile memory devices 120A-N via a traditional block I/O interface 131. Additionally, the SML 130 may provide access to enhanced functionality (large, virtual address space) through the SML interface 132. The metadata 135 may be used to manage and/or track storage operations performed through any of the Block I/O interface 131, SML interface 132, cache interface 133, or other, related interfaces.

The cache interface 133 may expose cache-specific features accessible via the storage management layer 130. Also, in some embodiments, the SML interface 132 presented to the storage clients 116 provides access to data transformations implemented by the non-volatile memory devices 120A-N and/or the non-volatile memory media controllers 126A-N.

The SML 130 may provide storage services through one or more interfaces, which may include, but are not limited to: a block I/O interface, an extended storage management layer interface, a cache interface, and the like. The SML 130 may present a logical address space 134 to the storage clients 116 through one or more interfaces. As discussed above, the logical address space 134 may comprise a plurality of logical addresses, each corresponding to respective media locations on one or more of the non-volatile memory devices 120A-N. The SML 130 may maintain metadata 135 comprising any-to-any mappings between logical addresses and media locations, as described above.

The SML 130 may further comprise a log storage module 137 that is configured to store data in a contextual, log format. The contextual, log data format may comprise associating data with persistent contextual metadata, such as the logical address of the data, or the like. The contextual, log format may further comprise associating data with respective sequence identifiers on the non-volatile memory media 122A-N, which define an ordered sequence of storage operations performed on the non-volatile memory devices 120A-N, as described above.

The SML 130 may further comprise a non-volatile memory device interface 139 configured to transfer data, commands, and/or queries to the non-volatile memory devices 120A-N over a bus 125, which may include, but is not limited to: a peripheral component interconnect express ("PCI Express" or "PCIe") bus, a serial Advanced Technology Attachment ("ATA") bus, a parallel ATA bus, a small computer system interface ("SCSI"), FireWire, Fibre Channel, a Universal Serial Bus ("USB"), a PCIe Advanced Switching ("PCIe-AS") bus, a network, Infiniband, SCSI RDMA, or the like. The non-volatile memory device interface 139 may communicate with the non-volatile memory devices 120A-N using input-output control ("IO-CTL") command(s), IO-CTL command extension(s), remote direct memory access, or the like.

The non-volatile memory system 102, in the depicted embodiment, includes a storage request module 150. The storage request module 150, in one embodiment, is configured to service storage requests for data of the non-volatile memory device 120 where the requested data is different than a block of the non-volatile memory device 120. In response to receiving a storage request, in certain embodiments, the storage request module 150 is configured to load data of at least a block size of the non-volatile memory device 120, internally within the non-volatile memory device 120 or the like. The storage request module 150 may use at least a portion of the loaded data to service the storage request, without transferring unused or excess portions of the loaded data over the bus 125 to the computing device 110. For example, the storage request module 150 might receive a storage request to read a data set sized smaller than a block, load the block (or blocks) containing the requested data, and service the storage request by returning only the requested data set, without unused data from the remainder of the loaded block(s). Using a storage request module 150 to service storage requests as disclosed herein allows a non-volatile memory device 120 to efficiently handle sub-block requests, non-block aligned requests, and to avoid inefficient transfers of unused data.

In one embodiment, the storage request module 150 may comprise executable software code, such as a device driver, SML 130, or the like, stored on the computer readable storage media 114 for execution on the processor 111. In another embodiment the storage request module 150 may comprise logic hardware of one or more of the non-volatile memory devices 120A-N, such as a non-volatile memory media controller 126A-N, a non-volatile memory controller 124, a device controller, a field-programmable gate array ("FPGA") or other programmable logic, firmware for an FPGA or other programmable logic, microcode for execution on a microcontroller, an application-specific integrated circuit ("ASIC"), or the like. In a further embodiment, the storage request module 150 may include a combination of both executable software code and logic hardware.

In one embodiment, the storage request module 150 is configured to receive storage requests from the SML 130 via a bus 125 or the like. The storage request module 150 may be further configured to transfer data to/from the SML 130 and/or storage clients 116 via the bus 125. Accordingly, the storage request module 150, in some embodiments, may comprise and/or be in communication with one or more direct memory access ("DMA") modules, remote DMA modules, bus controllers, bridges, buffers, and so on to facilitate the transfer of storage requests and associated data. In another embodiment, the storage request module 150 may receive storage requests as an API call from a storage client 116, as an IO-CTL command, or the like. The storage request module 150 is described in greater detail below with regard to FIGS. 3 and 4.

FIG. 1B is a block diagram of another embodiment of a system 101 comprising a storage request module 150. As described above, the storage request module 150 may be part of and/or in communication with a storage management layer 130. The SML 130 may operate on a non-volatile memory system 102 of a computing device 110, which, as discussed above, may comprise a processor 111, volatile memory 112, communication interface 113, and non-transitory, computer readable storage media 114. The communication interface 113 may comprise one or more network interfaces configured to communicatively couple the computing device 110 (and/or non-volatile memory controller 124) to a network 115 and/or to one or more remote, network-accessible storage clients 116.

The computing device 110 may comprise a non-volatile memory controller 124 that is configured to provide storage services to the storage clients 116. The storage clients 116 may include local storage clients 116 operating on the computing device 110 and/or remote, storage clients 116 accessible via the network 115 (and network interface 113). The non-volatile memory controller 124 comprises one or more non-volatile memory devices 120. Although FIG. 1B depicts a single non-volatile memory device 120, the disclosure is not limited in this regard and could be adapted to incorporate any number of non-volatile memory devices 120.

The non-volatile memory device 120 may comprise non-volatile memory media 122, which may include but is not limited to: NAND flash memory, NOR flash memory, nano random access memory ("nano RAM or NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM or PCM"), magnetic storage media (e.g., hard disk, tape), optical storage media, or the like. While the non-volatile memory media 122 is referred to herein as "memory media," in various embodiments, the non-volatile memory media 122 may more generally comprise a non-volatile recording media capable of recording data, which may be referred to as a non-volatile memory media, a non-volatile storage media, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, and the like. A non-volatile memory media controller 126 may be configured to manage storage operations on the non-volatile memory media 122, and may comprise one or more processors, programmable processors (e.g., field-programmable gate arrays), or the like. In some embodiments, the non-volatile memory media controller 126 is configured to store data on (and read data from) the non-volatile memory media 122 in the contextual, log format described above, and to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. As discussed above, the logical memory element may be partitioned into respective logical memory units (e.g., logical pages) and/or logical memory divisions (e.g., logical erase blocks). The logical memory units may be formed by logically combining physical memory units of each of the non-volatile memory elements. For example, if the non-volatile memory media 122 comprises twenty-five (25) non-volatile memory elements, each logical memory unit may comprise twenty-five (25) pages (a page of each element of non-volatile memory media 122).

The non-volatile memory media controller 126 may further be communicatively coupled to an internal memory 160 of the non-volatile memory device 120. The internal memory 160 may comprise volatile and/or non-volatile memory including, but not limited to, static RAM ("SRAM"), dynamic RAM ("DRAM"), magneto-resistive RAM ("MRAM"), nano random access memory ("nano RAM or NRAM"), phase change RAM ("PRAM or PCM"), NAND flash memory, NOR flash memory, and the like. In certain embodiments, the internal memory 160 may be larger than a logical memory division such as a logical erase block.

The non-volatile memory controller 124 may comprise a SML 130 and the non-volatile memory media controller 126. The SML 130 may provide storage services to the storage clients 116 via one or more interfaces 131, 132, and/or 133. In some embodiments, the SML 130 provides a block-device I/O interface 131 through which storage clients 116 perform block-level I/O operations. Alternatively, or in addition, the SML 130 may provide a storage management layer (SML) interface 132, which may provide other storage services to the storage clients 116. In some embodiments, the SML interface 132 may comprise extensions to the block device interface 131 (e.g., storage clients 116 may access the SML interface 132 through extensions to the block device interface 131). Alternatively, or in addition, the SML interface 132 may be provided as a separate API, service, and/or library. The SML 130 may be further configured to provide a cache interface 133 for caching data using the non-volatile memory system 102.

As described above, the SML 130 may present a logical address space 134 to the storage clients 116 (through the interfaces 131, 132, and/or 133). The SML 130 may maintain metadata 135 comprising any-to-any mappings between logical addresses in the logical address space 134 and media locations on the non-volatile memory device 120. The metadata 135 may comprise a logical-to-physical mapping structure with entries that map logical addresses in the logical address space 134 and media locations on the non-volatile memory device 120. The logical-to-physical mapping structure of the metadata 135, in one embodiment, is sparsely populated, with entries for logical addresses for which the non-volatile memory device 120 stores data and with no entries for logical addresses for which the non-volatile memory device 120 does not currently store data. The metadata 135, in certain embodiments, tracks data at a block level, with the SML 130 managing data as blocks.

The non-volatile memory system 102 may further comprise a log storage module 137, which, as described above, may be configured to store data on the non-volatile memory device 120 in a contextual, log format. The contextual, log data format may comprise associating data with a logical address on the non-volatile memory media 122. The contextual, log format may further comprise associating data with respective sequence identifiers on the non-volatile memory media 122, which define an ordered sequence of storage operations performed on the non-volatile memory media 122, as described above. The non-volatile memory controller 124 may further comprise a non-volatile memory device interface 139 that is configured to transfer data, commands, and/or queries to the non-volatile memory media controller 126 over a bus 125, as described above.

Figure 2:
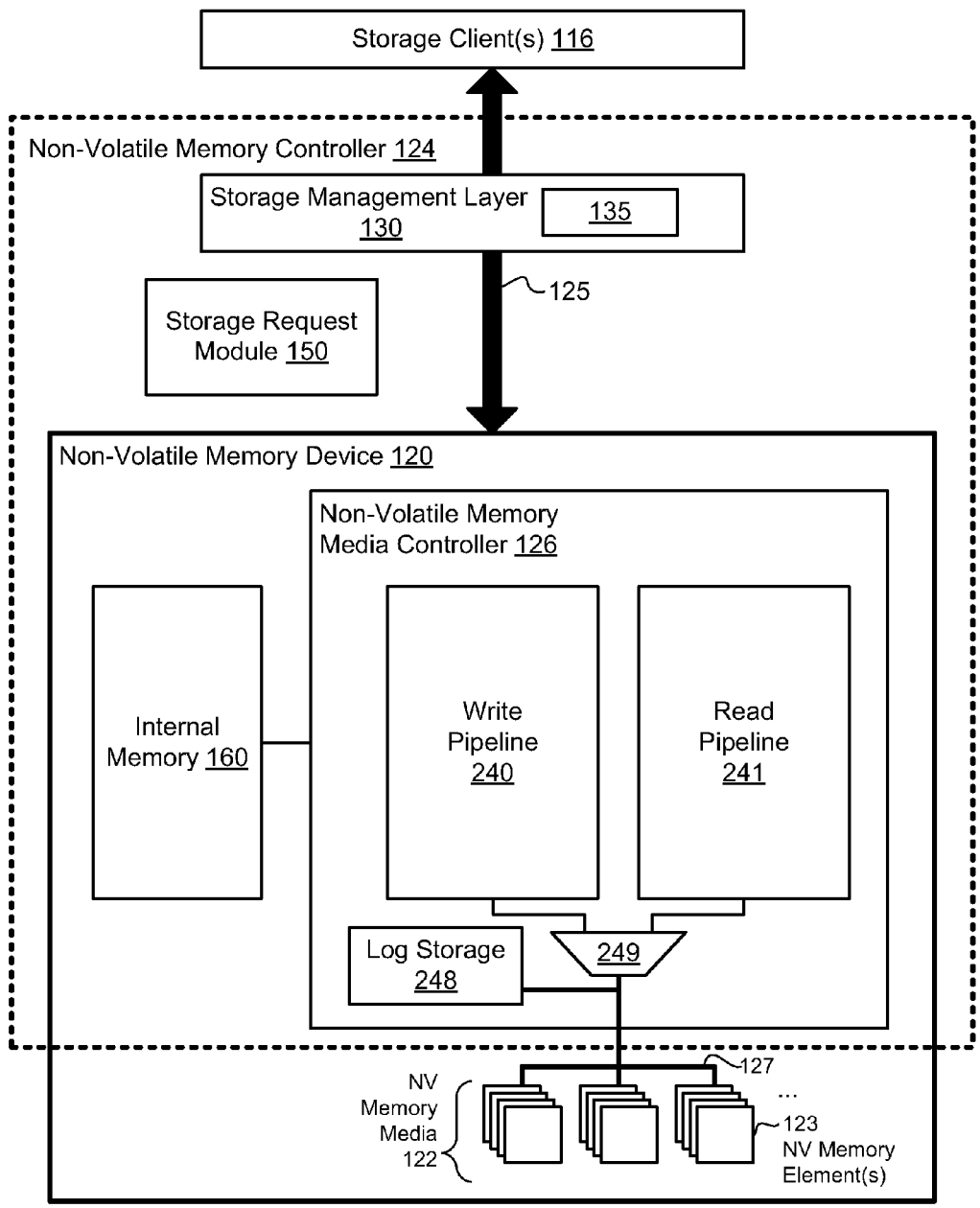
FIG. 2 is a schematic block diagram of one embodiment of a non-volatile memory controller.

FIG. 2 depicts another embodiment of a non-volatile memory controller 124 configured to service storage requests. The non-volatile memory device 120 may comprise a non-volatile memory media controller 126 and non-volatile memory media 122. The non-volatile memory media 122 may comprise a plurality of non-volatile memory elements 123, which may be communicatively coupled to the non-volatile memory media controller 126 via a bus 127, as described above.

The non-volatile memory media controller 126 may comprise a write pipeline 240 that is configured to store data on the non-volatile memory media 122 in a contextual format in response to requests received via the storage request module 150. The requests may include and/or reference data to be stored on the non-volatile memory media 122, may include logical address(es) of the data, and so on. As described above, the contextual format may comprise storing a logical address of the data in association with the data on the non-volatile memory media 122. For example, the write pipeline 240 may be configured to format data into packets, and may include the logical address of the data in a packet header (or other packet field). The write pipeline 240 may be configured to buffer data for storage on the non-volatile memory media 122. In some embodiments, the write pipeline 240 may comprise one or more synchronization buffers to synchronize a clock domain of the non-volatile memory media controller 126 with a clock domain of the non-volatile memory media 122 (and/or bus 127).

The log storage module 248 may be configured to select media location(s) for the data and may provide addressing and/or control information to the non-volatile memory elements 123 via the bus 127. In some embodiments, the log storage module 248 is configured to store data sequentially in a log format within the non-volatile memory media. The log storage module 248 may be further configured to groom the non-volatile memory media, as described above. In certain embodiments the log storage module 248 is substantially similar to the log storage module 137 as described above. The log storage module 248 may be executed by the SML 130 and/or by the non-volatile memory media controller 126.

Upon writing data to the non-volatile memory media, the non-volatile memory media controller 126 may be configured to update metadata 135 (e.g., a forward index) to associate the logical address(es) of the data with the media address(es) of the data on the non-volatile memory media 122. In some embodiments, the metadata 135 may be maintained on the non-volatile memory media controller 126; for example, the metadata 135 may be stored on the non-volatile memory media 122, on a volatile memory (not shown), or the like. Alternatively, or in addition, the metadata 135 may be maintained within the SML 130 (e.g., on a volatile memory 112 of the computing device 110 of FIGS. 1A and 1B). In some embodiments, the metadata 135 may be maintained in a volatile memory by the SML 130, and may be periodically stored on the non-volatile memory media 122.

The non-volatile memory media controller 126 may further comprise a read pipeline 241 that is configured to read contextual data from the non-volatile memory media 122 in response to requests received via the request module 250. The requests may comprise a logical address of the requested data, a media address of the requested data, and so on. The read pipeline 241 may be configured to read data stored in a contextual format from the non-volatile memory media 122 and to provide the data to the SML 130 and/or a storage client 116. The read pipeline 241 may be configured to determine the media address of the data using a logical address of the data and the metadata 135. Alternatively, or in addition, the SML 130 may determine the media address of the data and may include the media address in the request. The log storage module 248 may provide the media address to the non-volatile memory elements 123, and the data may stream into the read pipeline 241 via a buffer. The read pipeline 241 may comprise one or more read synchronization buffers for clock domain synchronization, as described above.

The non-volatile memory media controller 126 may further comprise a multiplexer 249 that is configured to selectively route data and/or commands to/from the write pipeline 240 and the read pipeline 241. In some embodiments, non-volatile memory media controller 126 may be configured to read data while filling a buffer of the write pipeline 240 and/or may interleave one or more storage operations on one or more banks of non-volatile memory elements 123 (not shown). The non-volatile memory media controller 126 may further be communicatively coupled to an internal memory 160, substantially as described above with reference to FIG. 1B.

Figure 3:
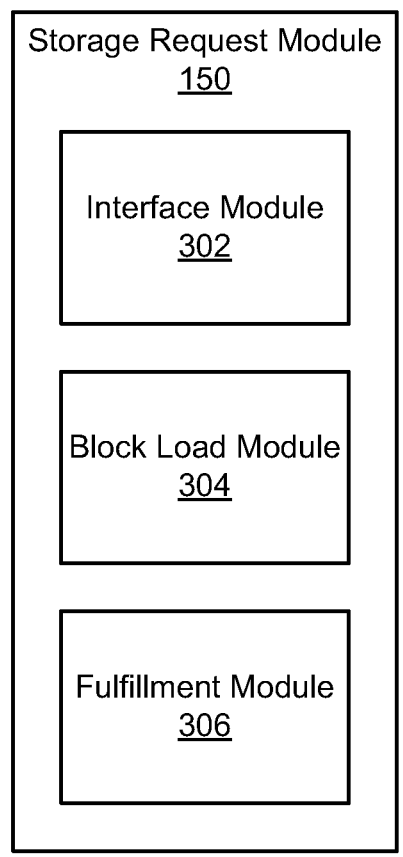
FIG. 3 is a schematic block diagram illustrating one embodiment of a storage request module.

FIG. 3 depicts one embodiment of a storage request module 150. The storage request module 150 may be substantially similar to the storage request module 150 described above with regard to FIGS. 1A, 1B, and 2. In general, as described above, the storage request module 150 services storage requests for data of the non-volatile memory device 120 where the requested data is different than a block of the non-volatile memory device 120. In the depicted embodiment, the storage request module 150 includes an interface module 302, a block load module 304, and a fulfillment module 306.

The interface module 302, in one embodiment, is configured to monitor, detect, or otherwise receive a storage request. In various embodiments, a means for receiving a storage request such as a write request may include an interface module 302, a storage request module 150, a non-volatile memory controller 124, a non-volatile memory media controller 126, a device driver such as a SML 130, a block I/O interface 131, a SML interface 132, a cache interface 133, a communication interface 113, a processor 111, a write pipeline 240, a system bus 125, a storage bus 127, other logic hardware, and/or other executable code stored on a computer readable storage medium. Other embodiments may include similar or equivalent means for receiving a write request or other storage request.

In one embodiment, the interface module 302 receives a storage request from a client such as a storage client 116. The interface module 302, in certain embodiments, may receive a storage request directly from a storage client 116, over a bus 125, as an API call from a storage client 116, or the like. In another embodiment, the interface module 302 may receive a storage request from a storage client 116 indirectly. For example, the interface module 302 may receive a storage request from another entity or module, may receive a storage request as part of a write pipeline 240 and/or read pipeline 241, or the like.

A storage request, in one embodiment, may include a read request, load request, or the like for reading data from the non-volatile memory device 120. In another embodiment, a storage request may include a write request, store request, program request, or the like for writing data to the non-volatile memory device 120. A write request may be for modifying or updating data already stored in the non-volatile memory device 120 (e.g., for data associated with a used logical address) or for new data not yet stored in the non-volatile memory device 120 (e.g., for data associated with a new or unused logical address). The interface module 302, in certain embodiments, may receive storage requests of other types, such as erase requests, TRIM requests, management requests, or the like, for performing other operations with data of the non-volatile memory device 120.

In one embodiment, the interface module 302 may receive storage requests for data sets of the non-volatile memory device 120 that are different from a block of the non-volatile memory device 120. As used herein, a "block" refers to a unit of storage/memory corresponding to a single logical address (e.g., an LBA) of a logical address space 134 of the non-volatile memory device 120. In some embodiments, the storage request module 150 may provide access to smaller data units than are otherwise addressable using a logical address alone, by using a logical address and additional information, such as an offset, a length, or the like. For example, the storage request module 150 may provide byte-level access to the non-volatile memory device 120 using the logical address for a block plus an offset for a byte within the block. Thus, in certain embodiments, while a block is the smallest unit of data addressable by a logical address without additional information, the storage request module 150 may provide sub-block or non-block aligned access using one or more logical addresses and additional information. In one embodiment, the size of a block may be fixed, so that the storage capacity (or represented storage capacity) of the non-volatile memory device 120 is divided into fixed-size blocks.

A block may comprise a logical block, a physical block, a native block, a presented block, a sector, a cluster, or the like. In one embodiment, a block size may be selected based on a physical division of a non-volatile memory device 120. For example, a hard disk drive non-volatile memory device 120 may use magnetic disks divided into sectors, and each sector may comprise a block. In another embodiment, a block size may be selected based on a size of a physical division, such as a physical page, a physical erase block, or the like, so that blocks evenly divide the physical division. For example, a NAND flash memory device or other solid-state storage device may use 2 KiB physical pages, and may use 512 byte blocks to evenly divide the physical pages or the like.

In a further embodiment, a block size may be selected based on a logical division of a data storage device, such as a logical page, a logical erase block, an error-correcting code ("ECC") chunk, a grouping of physical divisions, or the like. For example, a hard disk drive non-volatile memory device 120 with 512 byte sectors may track and manage data in 4 KiB clusters instead of at the individual sector level, so that each cluster comprises a block. Similarly, a non-volatile memory device 120 may comprise 2 KiB byte pages, but may track blocks using the metadata 135 at a 4 KiB granularity, or the like. In certain embodiments, a block size may be independent of one or more physical or logical divisions, and may be stored across physical and/or logical boundaries of the non-volatile memory device 120, such as a physical or logical page boundary, a physical or logical erase block boundary, non-volatile memory element 123 boundaries, or the like.

In some embodiments, a non-volatile memory device 120 may store data internally in "native blocks" but may provide access to data in "presented blocks" that are different from the native blocks. Presented blocks, in certain embodiments, have a different size than native blocks, allowing data access and data storage to occur at different granularities. In these embodiments, when comparing a data set to a block, "block" may refer to a native block, a presented block, or both, and the storage request module 150 may service storage requests for data sets that are different than a native block and/or a presented block of the non-volatile memory device 120.

The interface module 302 may receive and the storage request module 150 may service storage requests for a set of one or more presented blocks and/or native blocks of the non-volatile memory device 120, instead of or in addition to receiving and servicing storage requests for data sets that are different from a presented block and/or a native block. The length of a data set of a storage request that is different than a native and/or presented block, in various embodiments, may be less than, equal to, or greater than a native and/or presented block size of the non-volatile memory device 120. For example, in one embodiment, a data set of a storage request may be different from a block of the non-volatile memory device 120, but may still have a length equal to a block size of the non-volatile memory device 120, if the data set is offset or shifted from block boundaries, overlapping multiple blocks. Data sets and presented blocks are described in greater detail below with regard to FIG. 5.

In one embodiment, the interface module 302 is configured to receive storage requests for data sets that include data of a single range of contiguous logical addresses of the non-volatile memory device 120. In another embodiment, the interface module 302 supports "vectored" storage requests, where a data set may include data of multiple non-contiguous ranges of logical addresses.

The interface module 302, in one embodiment, is configured to use direct I/O, in which storage requests for data sets different from a block are handled without caching full blocks in a page cache of volatile memory 112 of the host computing device 110. In various embodiments, this direct I/O mode may be provided using an "open" system call for Unix-like systems with the "O_DIRECT" flag, or using similar or equivalent calls of various operating systems.

In one embodiment, a storage request for a data set may comprise a length of the data set and an offset for the data set within a block of the non-volatile memory device 120, to facilitate the storage request module 150 servicing storage requests for data sets different than a block of the non-volatile memory device 120. In another embodiment, the interface module 302 may comprise multiple channels or interfaces. For example, the interface module 302 may receive storage requests at a block size of the non-volatile memory device 120 on a first channel and may receive storage requests for data sets smaller than a block size of the non-volatile memory device 120 on a second channel, or the like. Embodiments with multiple channels or interfaces are described in greater detail below with regard to the block-offset interface 402, block device interface 404 and sub-block interface 406 of FIG. 4.

The block load module 304, in one embodiment, is configured to load data of at least the block size of the non-volatile memory device 120 for servicing a storage request received by the interface module 302. In various embodiments, a means for loading data may include a block load module 304, a storage request module 150, a read module 408 and/or a buffer module 410 (as described below with regard to FIG. 4), a non-volatile memory controller 124, a non-volatile memory media controller 126, a controller for internal memory 160, other logic hardware, and/or other executable code stored on a computer readable storage medium. Other embodiments may include similar or equivalent means for loading data.

In general, the block load module 304 loads data in one format or size, so that the fulfillment module 306 may fulfill a storage request in a different format or size. In one embodiment, where a storage request is for reading or modifying data already stored by the non-volatile memory device 120, the block load module 304 may be configured to read one or more data blocks of the non-volatile memory device 120, including a data set of the storage request, and load the one or more data blocks into an internal memory 160 of the non-volatile memory device 120. In an embodiment where the storage request is for a set of presented blocks, the block load module 304 may be configured to read a set of native blocks, including the set of presented blocks, from the non-volatile memory device 120, without outputting the set of native blocks over the communications bus 125 (e.g., loading the set of native blocks into an internal memory 160 of the non-volatile memory device 120 or the like). By loading data blocks internally within the non-volatile memory device 120, without outputting or sending the data blocks over the system bus 125, to the computing device 110, or the like, the storage request module 150 may conserve bandwidth of the system bus 125, may conserve volatile memory 112 of the computing device 110, or the like.

In a further embodiment, where a storage request is for writing data not yet stored by the non-volatile memory device 120 to the non-volatile memory device 120 at a storage request write granularity different from a block size of the non-volatile memory device 120, the block load module 304 may be configured to manage data by grouping or buffering data from a plurality of write requests into a data block of the non-volatile memory device 120. For example, a database storage client 116 may be configured to issue storage requests that write most data at an 8 KiB block size for the non-volatile memory device 120, but write log entries at a smaller 512 byte size. The block load module 304 may group multiple log entries together so that they can also be managed at the 8 KiB granularity. Various embodiments of the block load module 304 are described in greater detail below with regard to the read module 408 and the buffer module 410 of FIG. 4.

The fulfillment module 306, in one embodiment, is configured to service the storage request using at least a portion of the data that the block load module 304 loads. In various embodiments, a means for servicing a storage request, such as a write request may include a fulfillment module 306, a storage request module 150, a non-volatile memory controller 124, a non-volatile memory media controller 126, a discard module 412, modify-write module 414, or flush module 416 (as described with reference to FIG. 4 below), other logic hardware, and/or other executable code stored on a computer readable storage medium. Other embodiments may include similar or equivalent means for servicing a write request or other storage request.

In embodiments where the block load module 304 reads and loads data blocks, native blocks, or the like of the non-volatile memory device 120 into an internal memory 160 of the non-volatile memory device 120, the fulfillment module 306 may be configured to service the storage request by transforming the loaded blocks. Transforming the blocks may include discarding portions of the blocks, modifying the blocks and writing the modified blocks back to the non-volatile memory device 120, or the like to satisfy a storage request as described below with regard to the discard module 412 and the modify-write module 414 of FIG. 4.

In embodiments where the block load module 304 groups and/or buffers data from a plurality of write requests to form a data block, the fulfillment module 306 may be configured to service the storage request by writing the formed data block to the non-volatile memory device 120 (e.g., flushing the buffer), as described below with regard to the flush module 416 of FIG. 4. In other embodiments, the fulfillment module may be configured to service the storage request in another manner, using at least a portion of the loaded data. For example, for types of storage requests other than a read request or a write request, the storage request module 150 may service the storage request by using a different data transformation. Further embodiments of data transformations are described in U.S. patent application Ser. No. 13/248,016, entitled "Apparatus, system, and method for data transformations within a data storage device" and filed Sep. 28, 2011 for David Flynn et al., which is incorporated herein by reference in its entirety.

Figure 4:
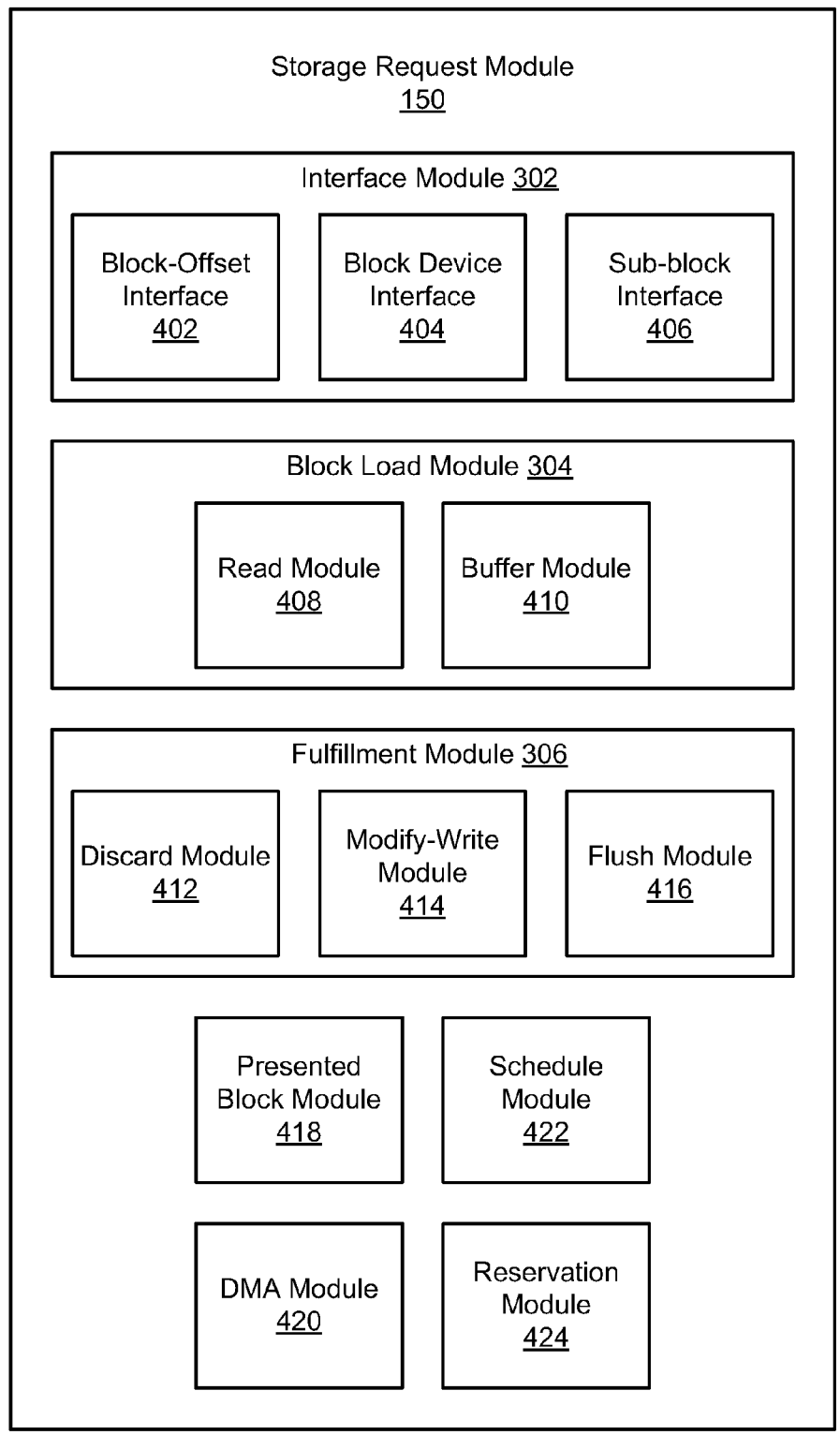
FIG. 4 is a schematic block diagram illustrating another embodiment of a storage request module.

FIG. 4 depicts another embodiment of the storage request module 150. The storage request module 150, in certain embodiments, may be substantially similar to the storage request module 150 described above with regard to FIGS. 1A, 1B, 2, and/or 3. In the depicted embodiment, the storage request module 150 includes an interface module 302, a block load module 304, and a fulfillment module 306, which may be configured substantially as described above with regard to FIG. 3. The storage request module 150, in the depicted embodiment, includes a presented block module 418, a direct memory access ("DMA") module 420, a schedule module 422, and a reservation module 424. The interface module 302, in the depicted embodiment, includes a block-offset interface 402, a block device interface 404, and a sub-block interface 406. The block load module 304, in the depicted embodiment, includes a read module 408 and a buffer module 410. The fulfillment module 306, in the depicted embodiment, includes a discard module 412, a modify-write module 414, and a flush module 416.

The interface module 302 may provide one or more interfaces or channels for receiving storage requests, such as the depicted block-offset interface 402, block device interface 404, and sub-block interface 406. Each interface may be configured for different types of storage requests, storage requests with different parameters, or the like. In one embodiment, the block-offset interface 402 is configured to receive a length of a data set and an offset within a block for the data set with a storage request for the data set. For example, the block-offset interface 402 may receive storage requests comprising a length parameter and an offset parameter, or the like.

In one embodiment, a storage request to the block-offset interface 402 may include a length of a data set directly (e.g., as a number of bytes from the offset to the end of the data set). In another embodiment, a storage request to the block-offset interface 402 may include a length of a data set indirectly (e.g., as endpoints comprising a first offset within a first block and a second offset within a second block). In a further embodiment, a storage request to the block-offset interface 402 may include a length of a data set implicitly (e.g., by including the data set itself) so that the interface module 302 may determine the length of the data set based on the storage request, based on an included data set, or the like.

In one embodiment, a storage request to the block-offset interface 402 may include a direct indicator of an offset for a data set, such as a number of bytes from the beginning of a block to a starting location of the data set or the like. Because, in certain embodiments, the SML 130 tracks metadata 135 at a block level, a block-offset interface 402 may allow access to data at sub-block granularity without requiring the SML 130 and/or the non-volatile memory device 120 to track additional metadata 135. Instead, a storage client 116 (such as a database, file system, or operating system) may provide a length of a data set and/or an offset for the data set within a block. Using a block-offset interface 402 may also allow a storage client 116 to use the non-volatile memory device 120 as a byte-addressable storage device simply by specifying that the length of a requested data set is one byte, or the like.

In one embodiment, a storage client 116 may manage and track data sets itself, sending storage requests with offsets and/or lengths over the block-offset interface 402 or the like. In another embodiment, a page cache or another component of an operating system, file system, or the like manages and tracks data sets so that each storage client 116 may not necessarily record a block, offset, and length for its own data sets. Even in a direct I/O mode, where a page cache does not cache blocks, the page cache may still keep track of block and offset information.

In another embodiment, the interface module 302 includes at least a first channel and a second channel, such as the block-offset interface 402, the block device interface 404, and/or the sub-block interface 406. In one embodiment, a first channel, such as the block device interface 404, is for servicing storage requests at a block size of the non-volatile memory device 120, and a second channel, such as the block-offset interface 402 and/or the sub-block interface 406, is for servicing storage requests for data sets smaller than a block of the non-volatile memory device 120. The sub-block interface 406, in certain embodiments, may be substantially similar to the block-offset interface 402 described above. In another embodiment, the block-offset interface 402 may service storage requests for data sets equal to or greater than a block size of the non-volatile memory device 120 as described above, and the sub-block interface 406 services storage requests for data sets less than a block size of the non-volatile memory device 120. The block-offset interface 402 and the sub-block interface 406, in various embodiments, may cooperate, may be integrated, or may otherwise be in communication to service storage requests.

For example, the interface module 302 may provide a standard block device interface 404 as a first channel for servicing storage requests at a full block granularity from legacy storage clients 116 or the like, and may provide the block-offset interface 402 and/or the sub-block interface 406 as a second channel for servicing storage requests for data sets smaller than or otherwise different than a block granularity. In this manner, the interface module 302, in certain embodiments, may support both block storage requests and sub-block storage requests, for storage clients 116 configured for sub-block storage requests and for storage clients 116 that are not configured for sub-block storage requests. In various embodiments, the interface module 302 may provide the block device interface 404 as a standard block device implementation and may provide the block-offset interface 402 and/or the sub-block interface 406 as an API or library, as one or more IO-CTL commands, as one or more IO-CTL extension commands, or the like.

In some embodiments, as described above with reference to FIG. 3, a non-volatile memory device 120 may store data internally in "native blocks." In these embodiments, the non-volatile memory device 120 is in communication with a host device, such as a computing device 110, over a communications bus, such as the bus 125. In these embodiments, the storage request module 150 may include a presented block module 418 to provide access to the data of the non-volatile memory device 120 in "presented blocks," where the presented block size differs from the native block size. Native blocks and presented blocks are described in further detail below with regard to FIG. 5.

In one embodiment, in cooperation with the presented block module 418 or the like, the block device interface 404 is configured to service storage requests at a presented block size, while storing and tracking data internally within the non-volatile memory device 120 at a native block size. The presented block module 418, in one embodiment, is configured to execute on a host device 110, as part of a device driver such as the SML 130 or the like. In certain embodiments, the non-volatile memory media controller 126 may include at least a portion of the interface module 302, the block load module 304, and the fulfillment module 306, which may communicate with the presented block module 418, the SML 130, or the like over the bus 125.

In one embodiment, the presented block module 418 is configured to define the presented block size and/or the native block size for the non-volatile memory device 120 based on or in response to user input. For example, in one embodiment, the presented block module 418 provides formatting options to a user of the computing device 110, allowing a user to dynamically select a presented block size and/or a native block size. So, for example, if a database storage client 116 writes a majority of data in 16 KiB chunks, but writes certain data in 512-byte chunks, a user may use the presented block module 418 to configure or format the non-volatile memory device 120 to use 16 KiB native blocks and 512 byte presented blocks, or the like. The block-offset interface 402 may map presented blocks, such as the 512 byte presented blocks of the example, to an offset within a corresponding native block, such as the 16 KiB native blocks of the example, as described above. Providing formatting options allowing users to dynamically select presented and/or native block sizes allows a user to have both the lower metadata overhead associated with larger native blocks and the convenience and efficiency of smaller presented blocks sized based on usage patterns of the user, or the like.

In one embodiment, for storage requests to read, modify, and/or update data already stored in the non-volatile memory device 120, the block load module 304 includes a read module 408 configured to read one or more data blocks of the non-volatile memory device 120, including a data set associated with the storage request, into an internal memory 160 of the non-volatile memory device 120. For example, the storage request may include a read request for a data set that is not block-aligned (e.g. smaller than a block, larger than a block, across a block boundary), a write request to modify or update a portion of one or more blocks, or the like. The read module 408, in certain embodiments, reads and/or loads data blocks from non-volatile memory media 122 into the internal memory 160, so that the fulfillment module 306 may satisfy the storage request without outputting or sending the full data blocks to the host computing device 110 over the bus 125, but may internally transform the data blocks within the non-volatile memory device 120 or the like. As described below with regard to the fulfillment module 306, in certain embodiments, the fulfillment module 306 uses the discard module 412 and/or the modify-write module 414 to service storage requests for which the read module 408 loads data.

In various embodiments, a means for reading one or more data blocks without outputting the data blocks (e.g., into an internal memory 160 of the non-volatile memory device 120) may include a read module 408, a block load module 304, a storage request module 150, a non-volatile memory controller 124, a non-volatile memory media controller 126, other logic hardware, and/or other executable code stored on a computer readable storage medium. Other embodiments may include similar or equivalent means for reading data blocks.

In one embodiment, for a storage request for a set of one or more presented blocks, the read module 408 is configured to read a set of one or more native blocks that include the set of presented blocks, without outputting the set of native blocks over the communications bus 125.

In one embodiment, for storage requests for writing data not yet stored by the non-volatile memory device 120 at a granularity other than a block size of the non-volatile memory device 120, the block load module 304 loads data using a buffer module 410 configured to group and/or buffer data from a plurality of write requests into a data block of the block size for the non-volatile memory device 120. In various embodiments, a means for grouping data may include a buffer module 410, a block load module 304, a storage request module 150, a non-volatile memory controller 124, a non-volatile memory media controller 126, a device driver such as a SML 130, other logic hardware, and/or other executable code stored on a computer readable storage medium. Other embodiments may include similar or equivalent means for grouping data. In one embodiment, the interface module 302 receives the plurality of write requests over the sub-block interface 406 (e.g. a second channel), as described above. The buffer module 410, in one embodiment, groups or buffers data in a hardware buffer of the non-volatile memory device 120, such as the internal memory 160 or the like.

In general, the buffer module 410 groups or buffers write requests for data sets smaller than a block size of the non-volatile memory device 120, to form a data block that the flush module 416, described below, may write to the non-volatile memory device 120 as a complete block. Certain storage clients 116, such as a database storage client 116 or the like, may write data to the non-volatile memory device 120 at several different granularities. For example, a database storage client 116 may store data in two modes or granularities, writing standard workload data at a larger data set size, such as 8 KiB or the like, and writing log entries at a smaller data set size, such as 512 bytes or the like. In certain embodiments, a storage client 116 such as a database may write certain types of data, such as log entries, at a smaller data set size than other types of data to ensure that the smaller data sets are persisted and not lost in case of a power failure or other restart event for the host computing device 110.

Instead of configuring the non-volatile memory device 120 to use a block size corresponding to the smaller data set size, either as native blocks or presented blocks, in one embodiment, the interface module 302 receives storage requests at a block size of the non-volatile memory device 120 over the block device interface 404, such as standard workload data sets from a database storage client 116, and receives storage requests at a sub-block size of the non-volatile memory device 120 over the sub-block interface 406, such as log entry data sets from a database storage client 116. The buffer module 410, in one embodiment, groups or buffers sub-block data sets from the sub-block interface 406, such as log entry data sets, together to form blocks of the block size of the non-volatile memory device 120.

The buffer module 410, in certain embodiments, buffers sub-block data sets in an internal hardware buffer of the non-volatile memory device 120, such as the internal memory 160, to ensure that the non-volatile memory device 120 persists the sub-block data sets in response to a power failure or other restart event. and the fulfillment module 306 may use the flush module 416, as described below, to write buffered sub-block data sets from the buffer module 410 to the non-volatile memory media 122 of the non-volatile memory device 120 in response to the grouping of buffered sub-block data sets, such as log entries, reaching the block size of the non-volatile memory device 120, thereby satisfying the associated storage requests. In a further embodiment, the flush module 416 may write buffered sub-block data sets from the buffer module 410 to the non-volatile memory media 122 in response to a restart event, such as a power failure, an improper shutdown, or the like for the host computing device 110.

The flush module 416 may write sub-block data sets to the non-volatile memory media 122, in certain embodiments, by placing the associated data in the write pipeline 240 described above with regard to FIG. 2, into a write buffer for the non-volatile memory media 122, or the like. In one embodiment, the non-volatile memory device 120 comprises a secondary power source, such as one or more capacitors, one or more batteries, or the like disposed within the non-volatile memory device 120. The secondary power source, in certain embodiments, is configured to provide a hold-up time sufficient to provide electric power for the flush module 416 and/or the write pipeline 240 to write data from the internal memory 160 to the non-volatile memory media 122 in response to a power loss associated with a restart event, so that the non-volatile memory device 120 persists data of the sub-block data sets of the buffer module 410 through the restart event.

As sub-block data sets are not directly addressable using the logical address space 134 of the non-volatile memory device 120, without an offset, as described above, in one embodiment, the reservation module 424 may determine logical addresses for data blocks that the buffer module 410 forms. The reservation module 424 is described in greater detail below. In certain embodiments, buffering sub-block data sets, such as log entries, to form full data blocks in a hardware buffer of the non-volatile memory device 120 allows the non-volatile memory device 120 to keep metadata overhead low by using large data blocks, while still providing power-cut protection for sub-block writes.

In one embodiment, the fulfillment module 306 satisfies storage requests using data the block load module 304 loads, using the read module 408 and/or the buffer module 410 as described above. The fulfillment module 306 may include one or more of a discard module 412, a modify-write module 414, and a flush module 416. The fulfillment module 306, in one embodiment, uses the discard module 412 to service read storage requests for data sets that are different than a block of the non-volatile memory device 120. The discard module 412, in one embodiment, is configured to transform data blocks loaded by the read module 408 by discarding one or more portions of the loaded data blocks internally within the non-volatile memory device 120 and returning the resulting data set to a requesting storage client 116 without the discarded portions.

The discarded portions may include unrequested portions that were not requested by the associated read storage request that the fulfillment module 306 is servicing, such as a portion between the start of a data block and the offset where a requested data set is located, a portion between the end of a data set and the end of a data block, or the like. In one embodiment, the discard module 412 services read storage requests for a set of one or more presented blocks by discarding portions of one or more native blocks that the read module 408 loads within the non-volatile memory device 120, and returning the resulting requested set of presented blocks without the discarded portions of the loaded native blocks.

By trimming or discarding unused or unrequested portions of data blocks internally within the non-volatile memory device 120, without outputting or sending the discarded portions over a communications bus 125 or to the host computing device 110, in certain embodiments, the discard module 412 reduces traffic on the communications bus 125, reduces use of volatile memory 112 of the computing device 110, or the like. The discard module 412, in a further embodiment, provides storage clients 116 with sub-block and/or byte level access to the non-volatile memory device 120 by trimming or discarding unused or unrequested portions of data blocks internally within the non-volatile memory device 120, even if the non-volatile memory device 120 is not natively byte addressable or otherwise byte accessible.

In one embodiment, to service a write storage request for a data set that is different than a block of the non-volatile memory device 120, the fulfillment module 306 uses the modify-write module 414. The modify-write module 414 services write storage requests to update or modify data already stored in the non-volatile memory device 120 using a read-modify-write operation internally within the non-volatile memory device 120. The modify-write module 414, in certain embodiments, is configured to transform data blocks loaded by the read module 408 by modifying the loaded data blocks using a data set received in association with a write storage request. The modify-write module, in a further embodiment, writes the modified data blocks back to the non-volatile memory media 122 of the non-volatile memory device 120, without outputting or sending the loaded data or the modified data over the communications bus 125 or to the host computing device 110.

In various embodiments, a means for modifying loaded data blocks may include a modify-write module 414, a fulfillment module 306, a storage request module 150, a non-volatile memory controller 124, a non-volatile memory media controller 126, a device driver such as a SML 130, a processor 111, other logic hardware, and/or other executable code stored on a computer readable storage medium. Other embodiments may include similar or equivalent means for modifying the data blocks. In one embodiment, where a storage request comprises a write request for a set of presented blocks, the modify-write module 414 may be configured to transform a set of native blocks loaded by the read module 408 by modifying the native blocks using the set of presented blocks and writing the modified set of native blocks back to the non-volatile memory device 120.

In one embodiment, the modify-write module 414 modifies loaded data blocks (or set of native blocks) by overwriting a portion of the loaded data blocks (or set of native blocks) with a received data set (or set of presented blocks) associated with a write request. The modify-write module 414, in certain embodiments, overwrites or otherwise modifies data blocks within volatile memory of the non-volatile memory device 120, such as the internal memory 160 described above. In one embodiment, the modify-write module 414 writes modified blocks to a different location within the non-volatile memory media 122 than the location from which the read module 408 read the loaded blocks. For example, in certain embodiments, the modify-write module 414 may write modified blocks to the non-volatile memory device 120 by writing the modified blocks to an append point of a sequential, log-based writing structure of the non-volatile memory device 120, such as the "append-only" log format described above with regard to the log storage module 137 and the log storage module 248.

In one embodiment, the storage request module 150 includes a DMA module 420 that cooperates with the modify-write module 414 to perform a read-modify-write operation. The DMA module 420, in certain embodiments, is configured to use a DMA operation to transfer a data set (or set of presented blocks) associated with a write storage request to the non-volatile memory device 120 so that the modify-write module 414 can use the data blocks (or set of native blocks) to service the write storage request. A DMA operation may include a transfer from the volatile memory 112 of the host computing device 110 to the non-volatile memory device 120, a transfer from another non-volatile memory device 120, a remote DMA transfer from a remote storage client 116 to the non-volatile memory device 120 over a network 115, or the like. In various embodiments, a means for performing a DMA operation may include a DMA module 420, a storage request module 150, a non-volatile memory controller 124, a non-volatile memory media controller 126, a DMA controller, other logic hardware, and/or other executable code stored on a computer readable storage medium. Other embodiments may include similar or equivalent means for performing a DMA operation.

In certain embodiments, the schedule module 422 is configured to cooperate with the DMA module 420 to schedule the non-volatile memory device 120, using the block load module 304 or the like, to begin reading one or more data blocks (or native blocks) from the non-volatile memory media 122 into internal memory 160 prior to completion of the DMA operation. The schedule module 422, in certain embodiments, is part of or in communication with the interface module 302, a device driver for the non-volatile memory device 120 such as the SML 130, or the like, so that the schedule module 422, in response to the interface module 302 receiving a storage request, may schedule the DMA module 420 to perform a DMA operation and schedule the block load module 304 and/or the read module 408 to load one or more data blocks into memory 160, without waiting for the DMA operation to complete.

In various embodiments, a means for scheduling a non-volatile memory device 120 to begin reading one or more data blocks into an internal memory 160 may include a schedule module 422, a storage request module 150, a block load module 304, a read module 408, a non-volatile memory controller 124, a non-volatile memory media controller 126, a device driver such as a SML 130, other logic hardware, and/or other executable code stored on a computer readable storage medium. Other embodiments may include similar or equivalent means for scheduling a non-volatile memory device 120 to begin reading one or more data blocks into an internal memory 160.

Scheduling the read portion of a read-modify-write operation to begin before a DMA operation completes, in certain embodiments, avoids delays caused by waiting for a DMA operation to complete prior to reading the data to be modified. In one embodiment, the DMA module 420 and the schedule module 422 may be configured to schedule the block load module 304 and/or the read module 408 to load one or more data blocks (or native blocks) into the internal memory 160 such that the one or more data blocks are already loaded into the internal memory 160 when the data set (or set of presented blocks) from an associated DMA operation arrives at the non-volatile memory device 120, so that the modify-write module 414 may complete the read-modify-write operation at or near an internal bus speed of the non-volatile memory device 120, with little or no delay.

Performing a read-discard operation as described above with regard to the discard module 412 and/or performing a read-modify-write operation as described above with regard to the modify-write module 414, in certain embodiments, may avoid the problem of reading or writing unused or unrequested data over the communications bus 125, which may be external to the non-volatile memory device 120 to couple the non-volatile memory device 120 to the host computing device 110 or the like. By limiting or eliminating the transfer of unused or unrequested data between the non-volatile memory device 120 and the host computing device 110, the storage request module 150 may reduce bandwidth on the communications bus 125, reduce processing overhead for the host computing device 110, reduce use of volatile memory 112 of the host computing device 110, or the like. The larger the block size for the non-volatile memory device 120, in one embodiment, the lower the overhead of tracking and maintaining metadata 135 for the non-volatile memory device 120, such as a logical-to-physical mapping or the like. While the storage request module 150 may transfer full data blocks with unused data within the non-volatile storage device 120 over an internal bus 127 or the like during read-discard and/or read-modify-write operations, in certain embodiments, the internal data bus 127 may have a higher bandwidth and/or throughput than the external bus 125. Further, the external bus 125 may be shared with other devices, reducing the bandwidth available to the non-volatile memory device 120, increasing the importance of reducing the transfer of unused or unrequested data on the bus 125.

As described above with regard to the buffer module 410, in one embodiment, the fulfillment module 306 includes a flush module 416 configured to write data blocks formed by the buffer module 410 to the non-volatile memory media 122. In various embodiments, a means for writing the data block may include a flush module 416, a fulfillment module 306, a storage request module 150, a non-volatile memory controller 124, a non-volatile memory media controller 126, a device driver such as a SML 130, other logic hardware, and/or other executable code stored on a computer readable storage medium. Other embodiments may include similar or equivalent means for writing the data block.

In one embodiment, in response to the buffer module 410 grouping or buffering sub-block data sets into a full data block, the flush module 416 writes the data block to the non-volatile memory media 122 using the block device interface 404 of the interface module 302 and/or using the write pipeline 240. In a further embodiment, the flush module 416 may write a data block from the buffer module 410 partially empty to the non-volatile memory media 122 in response to a restart event for the host computing device 110, such as a power cut, power failure, improper shutdown, or the like.

As described above, in certain embodiments, the buffer module 410 groups or buffers multiple sub-block data sets into complete blocks. However, a logical address space 134 of the non-volatile memory device 120 may not be configured to directly address a sub-block data set without an offset, or the like. Further, an operating system, file system, or the like of the host computing device 110 may manage logical addresses for the storage clients 116. Accordingly, sub-block data sets that the sub-block interface 406 receives may not be associated with a logical address. The reservation module 424, in one embodiment, is configured to determine a logical address, such as an LBA, for a data block formed by the buffer module 410, since the sub-block data sets that the buffer module 410 receives from the sub-block interface 406 may not otherwise be associated with or addressable by a logical address. In various embodiments, a means for determining a logical address may include a reservation module 424, a storage request module 150, a non-volatile memory controller 124, a non-volatile memory media controller 126, a device driver such as a SML 130, a processor 111, other logic hardware, and/or other executable code stored on a computer readable storage medium. Other embodiments may include similar or equivalent means for determining a logical address.

In one embodiment, the reservation module 424 cooperates with the interface module 302 and/or the block device interface 404 to determine a logical address for a data block formed from multiple sub-block data sets, such as database log entries or the like. For example, in embodiments where an operating system, a file system, or the like of the host computing device 110 manages or assigns logical addresses for storage clients 116 of the non-volatile memory device 120, a storage client 116, the SML 130, the buffer module 410, or the like may be configured to write or send a predetermined reservation indicator to the non-volatile memory device 120 through the operating system, file system, or the like, triggering the operating system, file system, or the like to assign or allocate one or more logical addresses for the predetermined reservation indicator, associate the allocated one or more logical addresses with a filename, or the like. In one embodiment, the operating system, file system, a storage client 116, or the like sends a write request for the non-volatile memory device 120 with the predetermined reservation indicator and one or more logical addresses, such as LBAs, using the block device interface 404.

The reservation module 424, in certain embodiments, is configured to cooperate with the interface module 302 and/or the block device interface 404 to detect and receive write requests that include a predefined reservation indicator, and to extract or otherwise determine a logical address, such as an LBA, for data blocks formed by the buffer module 410 based on the write requests. The reservation indicator, in one embodiment, comprises a predefined unique data pattern known to the reservation module 424 on the non-volatile memory device 120 and to an entity sending a reservation write request from the host computing device 110, such as the SML 130, a storage client 116, or the like. A reservation write request may be a fake or spoof write request with the reservation indicator, for the purposes of receiving one or more assigned logical addresses. For example, the reservation module 424 may extract the one or more logical addresses, such as LBAs, from a reservation write request for use with a data block from the buffer module 410, without writing the reservation indicator to the non-volatile memory device 120. In other embodiments, a storage client 116, the SML 130, or the like may assign a data block from the buffer module 410 a logical address from the logical address space 134 directly, without using a reservation write request, using an API, an IO-CTL command, or the like.

Figure 5:
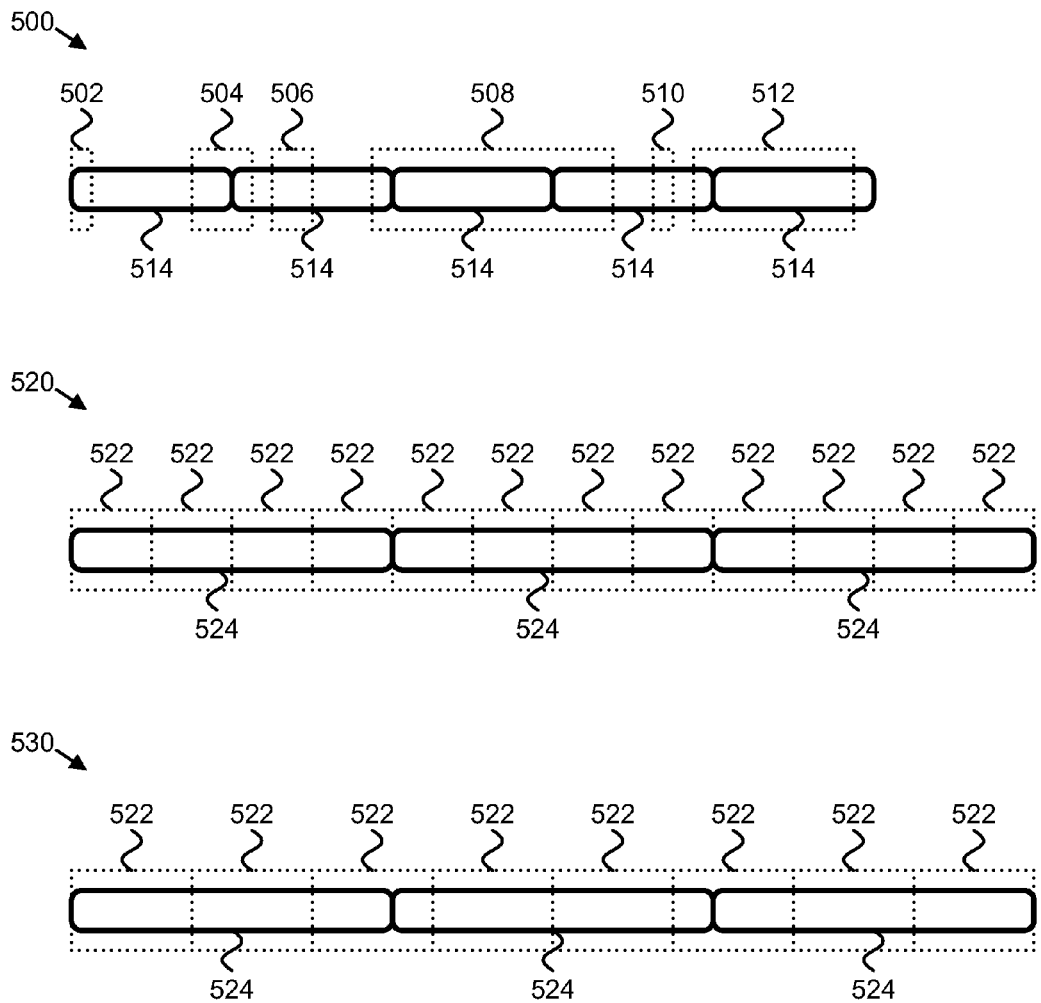
FIG. 5 is a schematic block diagram illustrating various embodiments of blocks and data sets of a non-volatile memory device.

FIG. 5 depicts embodiments of regions 500, 520, 530 of the logical address space 134 of the non-volatile memory device 120. In the first depicted embodiment, the region 500 includes a plurality of data blocks 514 and variable sized data sets 502, 504, 506, 508, 510, 512. In the second and third depicted embodiments, the regions 520, 530, include native blocks 524 and presented blocks 522.

As described above, a block refers to the unit of storage corresponding to a single logical address of the logical address space 134 of the non-volatile memory device 120. In certain embodiments, a block size may be selected based on a logical or physical division of the non-volatile memory device 120. In a further embodiment, a block size for the non-volatile memory device 120 may be dynamically selectable or configurable by a user or storage client 116. Because blocks 514, 524 are part of the internal configuration of a non-volatile memory device 120, they are sometimes referred to herein as internal, or native blocks 514, 524.

The non-volatile memory device 120 and/or the SML 139 may provide a block device interface 404 allowing storage clients 116 to access data in fixed-sized blocks 514, 522, 524. The size of the blocks 514, 522, 524 may be equal to or different from the size of an internal block 514, 524. If the sizes are different, then the transmission units are referred to herein as presented blocks 522 to distinguish them from native blocks 514, 524. Like native blocks 514, 524, presented blocks 522 also logically divide the storage capacity of the non-volatile memory device 120 into fixed-size units.

The first depicted region 500 includes blocks 514 and variable sized data sets 502, 504, 506, 508, 510, 512 of storage requests. In the depicted embodiment, each data set 502, 504, 506, 508, 510, 512 comprises a contiguous range of data of the non-volatile memory device 120. In another embodiment, the block-offset interface 402 and/or the sub-block interface 406 support vectored storage requests, where a data set may include multiple non-contiguous ranges of data. For example, in certain embodiments, data from the depicted data sets 502, 504, 506 may be read using three separate read requests, one for each data set 502, 504, 506, or by sending one single vectored read request for a vectored data set comprising data of the three data sets 502, 504, 506.

In some embodiments, the lengths of the data sets 502, 504, 506, 508, 510 may be different from the size of a block 514. For example, as depicted, the length of the data set 508 is greater than the size of a block 514, comprising one full block 514 and two partial blocks 514. The lengths of the data sets 502, 504, 506, 510 are less than the size of a block 514. For example, if the block size is 512 bytes, the length of the data sets 502, 504, 506, 510 may be less than 512 bytes, or the like.

In another embodiment, the length of the data set 512 may be equal to the size of a block 514, but the data set 512 itself may be different from a block 514, offset from boundaries of a block 514. For example, a 512-byte data set may begin halfway through one 512-byte block 514 and extend to the halfway point of the next 512-byte block 514, or the like. Data sets 508, 512 with a length greater than or equal to the block size include data of at least two blocks 514, and data sets 502, 504, 506, 510 with a length less than the block size may or may not include data of multiple blocks 514. For example, the data sets 502, 504, 506, 510 have lengths less than the size of a block 514; the data sets 502, 506, 510 each comprise data of one block 514; while the data set 504 includes data of two blocks 514. The data sets 508, 512 have lengths greater than or equal to the size of a block 514, and comprise data of at least two blocks 514.

In some embodiments, the length of a data set 502, 504, 506, 508, 510, 512 may be selected to allow data access at arbitrarily small granularity, limited only by a minimum DMA size. As used herein, the minimum DMA size refers to the size of the smallest unit of data transmissible between the volatile memory 112 and the non-volatile memory device 120. In one embodiment, the volatile memory 112 is accessible at an individual byte level, and the minimum DMA size is one byte, so the length of a data set 502, 504, 506, 508, 510, 512 may be as small as one byte. Embodiments where the length of a data set 502, 504, 506, 508, 510, 512 is limited by the minimum DMA size may allow storage access to the non-volatile memory device 120 at the same granularity as volatile memory access. In another embodiment, a storage client 116 may dynamically select a length of a data set 502, 504, 506, 508, 510, 512 from a plurality of supported lengths, by including an indicator of the selected length in a storage request to the interface module 302, including a data set of the selected length in a storage request to the interface module 302, or the like.

In one embodiment, a region 500, 520, 530 or range of the logical address space 134 of the non-volatile memory device 120 may be mapped into an address space of the processor 111, such as a physical address space, a virtual address space, or the like, using memory mapped I/O ("MMIO"), port I/O, port-mapped I/O, memory mapped file I/O, or the like. Instead of using a page cache to aggregate data into blocks for synchronizing, destaging, or flushing to the non-volatile memory device 120 a block at a time, in certain embodiments, a memory system, memory manager, or the like may be configured to synchronize, destage, or flush data from the volatile memory 112 at a sub-block granularity, a byte granularity, or the like using the block-offset interface 402 or the like.

The second and third depicted regions 520, 530, include native blocks 524 and presented blocks 522. The native blocks 524 are substantially similar to the blocks 514 described above, but are referred to as native blocks 524 to distinguish them from the presented blocks 522. The non-volatile memory device 120 may store data internally as native blocks 524, but the presented block module 418 described above may provide access to the data as presented blocks 522. In the depicted embodiments, the presented blocks 522 are smaller than the native blocks 524, to minimize both the metadata overhead associated with the native blocks 524 and the transmission of unused or unrequested data in the presented blocks 522. In the region 520, the presented blocks 522 evenly divide the native blocks 524 and align with the boundaries of native blocks 524, so that servicing a storage request for a presented block 522 involves one native block 524. In the region 530, the presented blocks 522 divide the data storage region 530 into fixed-size units without evenly dividing the native blocks 524; thus some presented blocks 522 cross the boundaries of native blocks 524.

Figure 6:
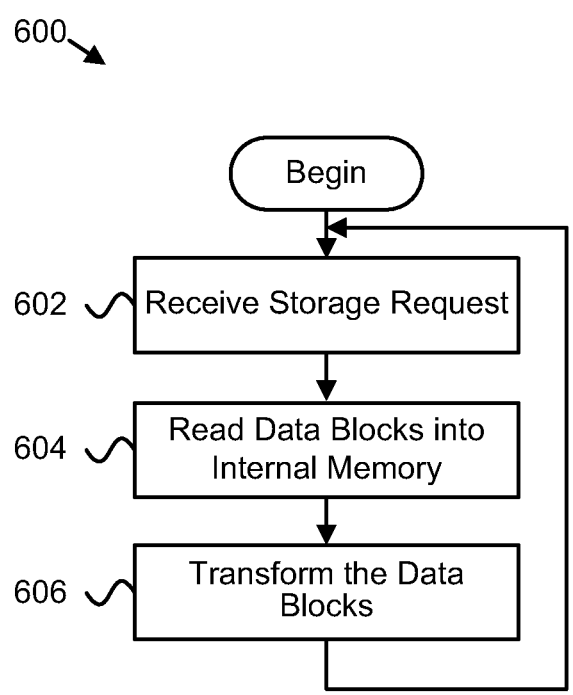
FIG. 6 is a schematic flow chart diagram illustrating one embodiment of a method for servicing storage requests for a non-volatile memory device.

FIG. 6 depicts one embodiment of a method 600 for servicing storage requests. The method 600 begins, and the interface module 302 receives 602 a storage request for a data set different from a block of a non-volatile memory device 120. The block load module 304 reads 604 one or more data blocks of the non-volatile memory device 120, including or otherwise associated with the data set, into an internal memory 160 of the non-volatile memory device 120. The fulfillment module 306 transforms 606 the data blocks to service the storage request. The interface module 302 continues to receive 602 additional storage requests, and the method 600 continues.

Figure 7:
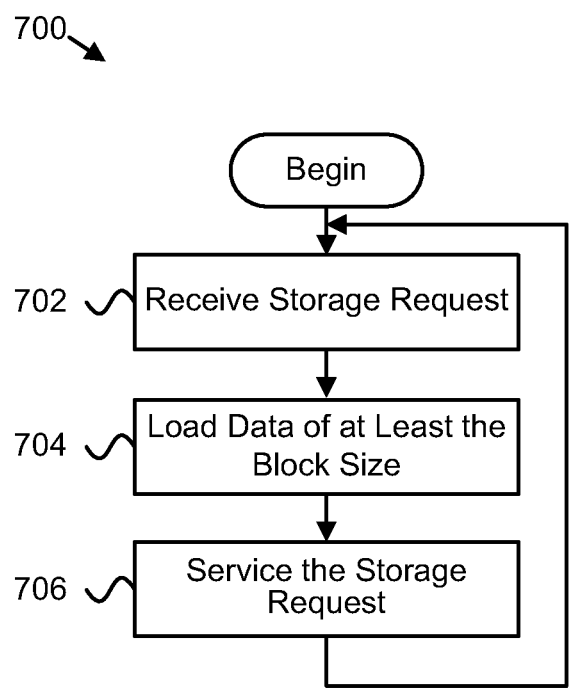
FIG. 7 is a schematic flow chart diagram illustrating another embodiment of a method for servicing storage requests for a non-volatile memory device.

FIG. 7 depicts another embodiment of a method 700 for servicing storage requests. The method 700 begins, and the interface module 302 receives 702 a storage request from a client such as a storage client 116, for a data set of a non-volatile memory device 120. The length of the data set may be different from a block size of the non-volatile memory device 120. In one embodiment, the interface module 302 uses the block-offset interface 402 to receive the length of the data set and an offset within a block for the data set with the storage request. In another embodiment, the interface module 302 provides a first channel and a second channel, where the first channel includes the block device interface 404 for servicing storage requests at the block size of the non-volatile memory device 120, and the second channel includes the sub-block interface 406 for servicing storage requests for data sets smaller than a block of the non-volatile memory device 120. In certain embodiments, the presented block module 418, executing on the host device, provides access to the data of the non-volatile memory device 120 in presented blocks, and the presented block size differs from the native block size.

The block load module 304 loads 704 data of at least the block size of the non-volatile memory device 120. In one embodiment, the block load module 304 uses the read module 408 to read one or more data blocks of the non-volatile memory device 120, including the data set, into an internal memory 160 of the non-volatile memory device 120. In another embodiment, the block load module 304 uses the buffer module 410 to group and/or buffer data from a plurality of write requests into a data block of the block size for the non-volatile memory device 120.

The fulfillment module 306 services 706 the storage request using at least a portion of the loaded data. In one embodiment the fulfillment module 306 uses the discard module 412 to transform the data blocks loaded by the read module 408 by discarding one or more portions of the data blocks within the non-volatile memory device 120, and returning the data set to a storage client 116 without the discarded portions. In another embodiment, the fulfillment module 306 uses the modify-write module 414 to transform the data blocks loaded by the read module 408 by modifying the data blocks using the data set and writing the modified data blocks back to the non-volatile memory device 120. In a further embodiment, the method 700 includes the DMA module 420 performing a DMA operation to transfer the data set to the non-volatile memory device 120 so that the modify-write module 414 can modify the data blocks. The method 700, in another embodiment, includes a schedule module 422 scheduling the non-volatile memory device 120 to begin reading the data blocks prior to completion of the DMA operation.

In a different embodiment, the method 700 includes the fulfillment module 306 writing the data block from the buffer module 410 to the non-volatile memory device 120, using the flush module 416 or the like. In a further embodiment, the method includes a reservation module 424 determining a logical address, such as an LBA, for the data block from the buffer module 410. The interface module 302 continues to receive 702 storage requests, and the method 700 continues.

Figure 8:
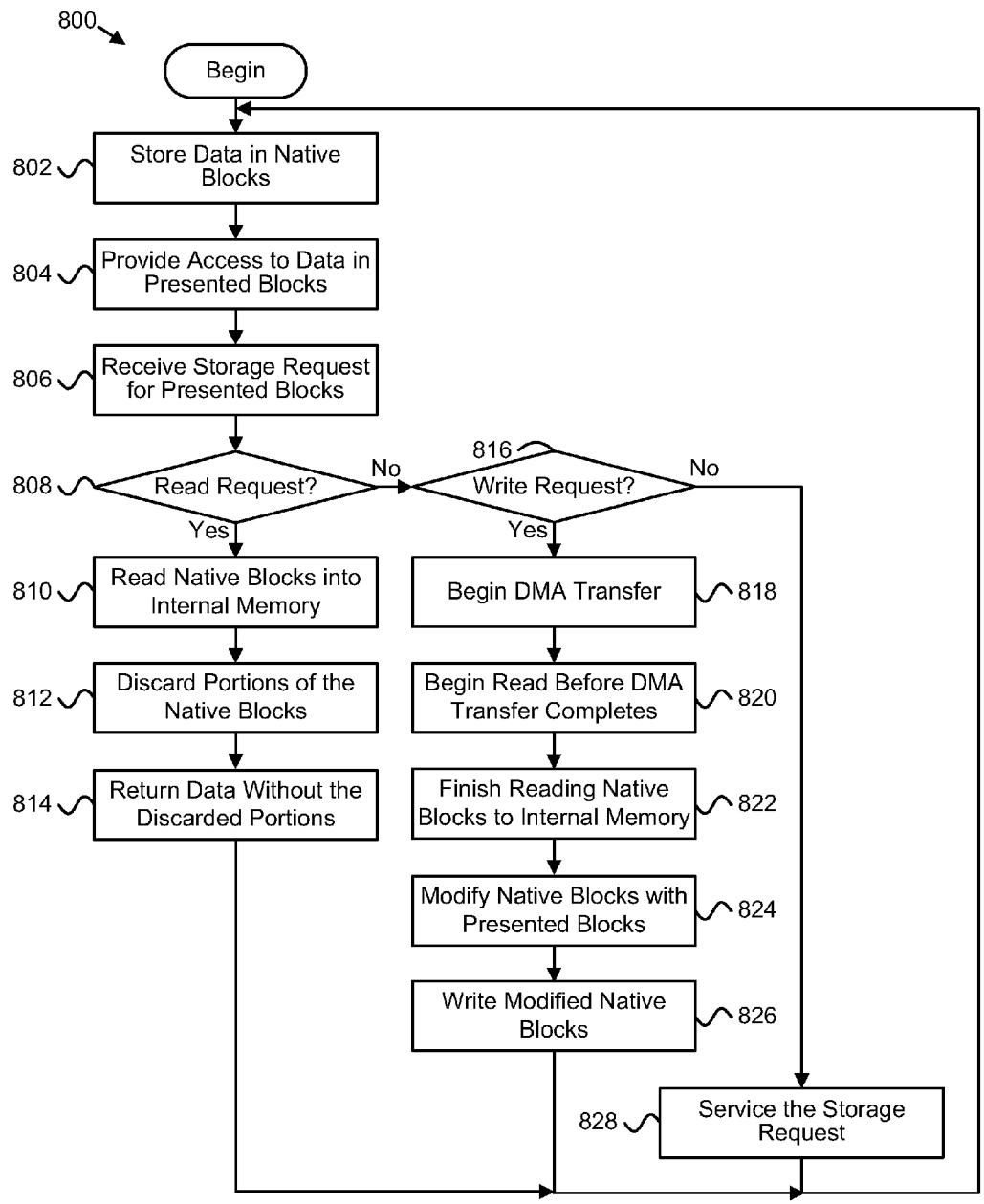
FIG. 8 is a schematic flow chart diagram illustrating another embodiment of a method for servicing storage requests for a non-volatile memory device.

FIG. 8 depicts another embodiment of a method 800 for servicing storage requests. The method 800 begins, and the non-volatile memory device 120, in communication with a host computing device 110 over a communications bus 125, stores 802 data in one or more native blocks. The presented block module 418, executing on the host computing device 110, provides 804 access to the data of the non-volatile memory device 120 as one or more presented blocks, with a presented block size differing from the native block size. The interface module 302 receives 806 a storage request for a set of one or more presented blocks over the block device interface 404, and determines 808 if the storage request is a read request.

If the storage request is a read request, the block load module 304, using the read module 408 or the like, reads 810 a set of native blocks of the non-volatile memory device 120, including the set of presented blocks, without outputting the set of native blocks over the communications bus 125 (e.g., into an internal memory 160 of the non-volatile memory device 120). The fulfillment module 306 services the storage request using the discard module 412, by discarding 812 portions of the set of native blocks within the non-volatile memory device 120 and returning 814 the set of presented blocks without the discarded portions. The non-volatile memory device 120 continues to store 802 data in one or more native blocks and the method 800 continues.

If the storage request is not a read request, the interface module 302 determines 816 if the storage request is a write request. If the storage request is a write request, the DMA module 420 begins 818 performing a DMA operation to transfer the set of presented blocks to the non-volatile memory device 120. The schedule module 422 schedules the non-volatile memory device 120 to begin 820 reading a set of native blocks of the non-volatile memory device 120 prior to completion of the DMA operation, using the block load module 304 and/or the read module 408. The read module 408 finishes 822 reading the set of native blocks, including the set of presented blocks, without outputting the set of native blocks over the communications bus (e.g., into an internal memory 160 of the non-volatile memory device 120). The fulfillment module 306, using the modify-write module 414 or the like, transforms the set of native blocks to service the storage request, by modifying 824 the set of native blocks with the set of presented blocks and writing 826 the modified set of native blocks to the non-volatile memory device 120. The non-volatile memory device 120 continues to store 802 data in one or more native blocks and the method 800 continues.

If the storage request is neither a read request nor a write request, the fulfillment module 306 services 828 the storage request in another way, performing a different data transformation on a set of native blocks loaded by the block load module 304 or the like. The non-volatile memory device 120 continues to store 802 data in one or more native blocks and the method 800 continues.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
   receiving a storage request for a data set of a non-volatile storage device, the data set different in size from a data block size associated with an address space of the non-volatile storage device;
   scheduling the non-volatile storage device to begin reading one or more data blocks of the non-volatile storage device before the data set identified by the storage request arrives at the non-volatile storage device, the one or more data blocks comprising the data set identified by the storage request;
   reading the one or more data blocks comprising the data set into a memory of the non-volatile storage device; and
   transforming the data blocks in the memory of the non-volatile storage device to service the storage request by modifying the data blocks using the data set identified by the storage request and writing the modified data blocks to the non-volatile storage device.

2. The method of Claim 1, further comprising:
   using a Direct Memory Access ("DMA") operation to transfer the data set to the non-volatile storage device for modifying the data blocks.

3. The method of Claim 1, wherein modifying the data blocks comprises overwriting a portion of the data blocks with the data set.

4. The method of Claim 1, wherein writing the modified data blocks to the non-volatile storage device comprises writing the modified data blocks to an append point of a sequential log-based writing structure of the non-volatile storage device.

5. The method of claim 1, wherein a length of the data set is less than a data block size for the non-volatile storage device.

6. The method of claim 1, wherein a length of the data set is dynamically selectable by a client from a plurality of supported lengths, the storage request comprising an indicator of the length.

7. An apparatus comprising:
   an interface module configured to receive a storage request from a client, the storage request for a data set of a non-volatile memory device, wherein a length of the data set differs from a data block size associated with an address space of the non-volatile memory device;
   a schedule module configured to schedule the non-volatile memory device to begin loading data of at least the data block size of the non-volatile memory device before the data set identified by the storage request arrives at the non-volatile memory device, the data of at least the data block size comprising the data set identified by the storage request;
   a block load module configured to load the data of at least the data block size, comprising the data set, into a memory of the non-volatile memory device; and
   a fulfillment module configured to service the storage request using at least a portion of the loaded data from the memory of the non-volatile memory device, by modifying the loaded data using the data set and writing the modified data to the non-volatile memory device.

8. The apparatus of claim 7, wherein the storage request comprises a write request and:
   the block load module is configured to load the data by reading one or more data blocks of the non-volatile memory device into an internal memory of the non-volatile memory device, the data blocks associated with the data set; and
   the fulfillment module is configured to service the storage request by modifying the data blocks using the data set and writing the modified data blocks to the non-volatile memory device.

9. The apparatus of claim 8, further comprising:
a Direct Memory Access ("DMA") module configured to perform a DMA operation to transfer the data set to the non-volatile memory device for modifying the data blocks.

10. The apparatus of claim 7, wherein the interface module is configured to receive the length of the data set and an offset within a block for the data set with the storage request.

11. The apparatus of claim 7, wherein the interface module comprises a first channel and a second channel, the first channel comprising a block device interface for servicing storage requests at the data block size of the non-volatile memory device, the second channel for servicing storage requests for data sets smaller than a block of the non-volatile memory device.

12. The apparatus of claim 11, wherein:
the block load module is configured to load the data by grouping data from a plurality of write requests received over the second channel into a data block of the data block size of the non-volatile memory device; and
the fulfillment module is configured to write the data block to the non-volatile memory device over the first channel.

13. The apparatus of claim 12, wherein the fulfillment module is configured to write the data block partially empty to the non-volatile memory device in response to a power cut event.

14. The apparatus of claim 12, further comprising a reservation module configured to determine a logical block address ("LBA") for the data block by:
receiving a write request over the first channel, the write request comprising a reservation indicator and the LBA; and
extracting the LBA from the write request for use as the LBA for the data block without writing the reservation indicator to the non-volatile memory device.

15. An apparatus comprising:
means for receiving a write request from a client, the write request for a data set of a non-volatile storage device, a length of the data set less than a block size associated with an address space for the non-volatile storage device;
means for scheduling the non-volatile storage device to begin loading data of at least the data block size of the non-volatile storage device before the data set identified by the write request arrives at the non-volatile storage device, the data of at least the data block size associated with the data set identified by the write request;
means for loading the data of at least the block size, associated with the data set, into a memory of the non-volatile memory device; and
means for servicing the write request using at least a portion of the loaded data from the memory of the non-volatile memory device, by modifying the loaded data using the data set and writing the modified data to the non-volatile storage device.

16. The apparatus of claim 15, further comprising:
means for reading one or more data blocks of the non-volatile storage device without outputting the data blocks, the data blocks associated with the data set;
means for modifying the data blocks using the data set and writing the modified data blocks to the non-volatile storage device;
means for using a Direct Memory Access ("DMA") operation to transfer the data set to the non-volatile storage device for modifying the data blocks.

17. The apparatus of claim 15, further comprising:
means for grouping data from a plurality of write requests into a data block of the block size for the non-volatile memory device;
means for writing the data block to the non-volatile storage device; and
means for determining a logical block address ("LBA") of the data block by receiving a write request comprising a reservation indicator and the LBA, and extracting the LBA from the write request for use as the LBA of the data block without writing the reservation indicator to the non-volatile storage device.

18. A system comprising:
a non-volatile recording device configured to store data in one or more native blocks of a native block size, the non-volatile recording device in communication with a host device over a communications bus;
a presented block module configured to provide access to the data of the non-volatile recording device as one or more presented blocks of a presented block size, the presented block size differing from the native block size;
an interface module configured to receive a storage request for a set of one or more presented blocks;
a block load module configured to read a set of one or more native blocks of the non-volatile recording device without outputting the set of native blocks over the communications bus, the set of native blocks including the set of presented blocks;
a schedule module configured to schedule the non-volatile recording device to begin reading the set of native blocks before the set of presented blocks arrives at the non-volatile recording device; and
a fulfillment module configured to transform the set of native blocks to service the storage request by modifying the set of native blocks using the set of presented blocks and writing the modified set of native blocks to the non-volatile recording device.

19. The system of claim 18, further comprising:
a Direct Memory Access ("DMA") module configured to perform a DMA operation to transfer the set of presented blocks to the non-volatile recording device.

20. The system of claim 18, wherein the presented block module is configured to define one or more of the presented block size and the native block size in response to user input.

21. The system of claim 18, further comprising the host device, a device driver comprising the presented block module, and a non-volatile memory media controller of the non-volatile recording device comprising the block load module and the fulfillment module.

22. A computer program product comprising a non-transitory computer readable medium storing computer usable program code executable to perform operations comprising:
storing data of a non-volatile memory device in one or more native blocks of a native block size, the non-volatile memory device configurable to communicate with a host device over a communications bus;
providing access to the data of the non-volatile memory device from the host device as one or more presented blocks of a presented block size, the presented block size smaller than the native block size, wherein one or more of the presented block size and the native block size is defined in response to user input;
receiving a storage request for a set of one or more presented blocks;
scheduling the non-volatile memory device to begin reading a set of one or more native blocks of the non-volatile memory device before the set of presented blocks arrives at the non-volatile memory device, the set of native blocks including the set of presented blocks;

reading the set of one or more native blocks including the set of presented blocks; and transforming the set of native blocks to service the storage request by modifying the set of native blocks using the set of presented blocks and writing the modified set of native blocks to the non-volatile memory device.

* * * * *